United States Patent
Shimizu et al.

(10) Patent No.: US 7,526,012 B2
(45) Date of Patent: Apr. 28, 2009

(54) INTERFERENCE REDUCTION APPARATUS AND METHOD

(75) Inventors: Masahiko Shimizu, Kawasaki (JP); Tsuyoshi Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 594 days.

(21) Appl. No.: 10/999,684

(22) Filed: Nov. 30, 2004

(65) Prior Publication Data

US 2005/0276315 A1    Dec. 15, 2005

(30) Foreign Application Priority Data

Jun. 11, 2004    (JP)    ............... 2004-173793

(51) Int. Cl.
  *H04B 1/00*    (2006.01)
(52) U.S. Cl. .................. 375/148; 375/150; 375/152; 375/346; 375/349
(58) Field of Classification Search ................ 375/148, 375/150, 152, 346, 349
See application file for complete search history.

(56) References Cited

U.S. PATENT DOCUMENTS

| | | | |
|---|---|---|---|
| 6,175,587 B1 | 1/2001 | Madhow et al. | |
| 6,678,313 B1 * | 1/2004 | Imaizumi et al. | ............ 375/150 |
| 7,151,792 B2 * | 12/2006 | Shimizu et al. | ............ 375/148 |
| 2002/0131479 A1 | 9/2002 | Butler et al. | |
| 2003/0086482 A1 | 5/2003 | Shimizu et al. | |

FOREIGN PATENT DOCUMENTS

| | | |
|---|---|---|
| EP | 876 002 | 11/1998 |
| EP | 1 304 815 | 4/2003 |
| EP | 1 548 953 | 6/2005 |
| JP | 2003-133999 | 5/2003 |

OTHER PUBLICATIONS

European Search Report dated Apr. 23, 2008, from the corresponding European Application.
European Search Report dated Sep. 27, 2005.
Tsuyoshi Hasegawa, et al. Multipath Interference Reduction Method using Multipath Interference Correlative Timing for DS-CDMA Systems. IEEE 55th Vehicular Technology Conference, May 6, 2002, vol. 3 of 4, pp. 1205-1209, XP001214486.

* cited by examiner

*Primary Examiner*—Ted Wang
(74) *Attorney, Agent, or Firm*—Katten Muchin Rosenman LLP

(57) ABSTRACT

A autocorrelation peak detector (54) and a interference-reducing timing generator (55) decide interference-reducing timings $\tau \pm (\tau_2 - \tau_1)$ for eliminating interference components that arrive from an adjacent base station, and a path searcher (53) decides the path timing $\tau$ of multipath from a base station with which communication is currently in progress. A despreading timing decision unit (56) decides a plurality of despreading timings $\tau, \tau \pm (\tau_2 - \tau_1)$ from the above-mentioned timings, fingers ($57_1$ to $57_3$) despread a receive spread-spectrum signal at respective ones of the despreading timings, and a RAKE combiner (58) weights and combines a plurality of results of despreading to thereby diminish interference components.

12 Claims, 23 Drawing Sheets

FIG. 8
(A)
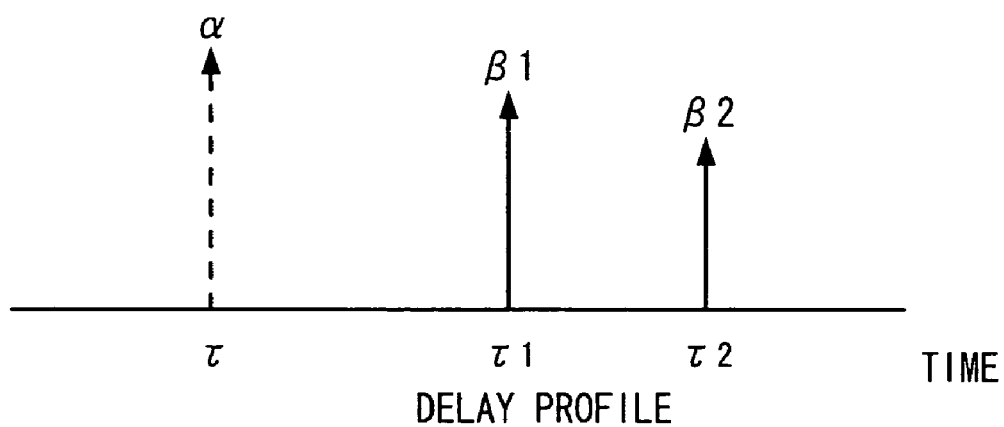
DELAY PROFILE
(B)
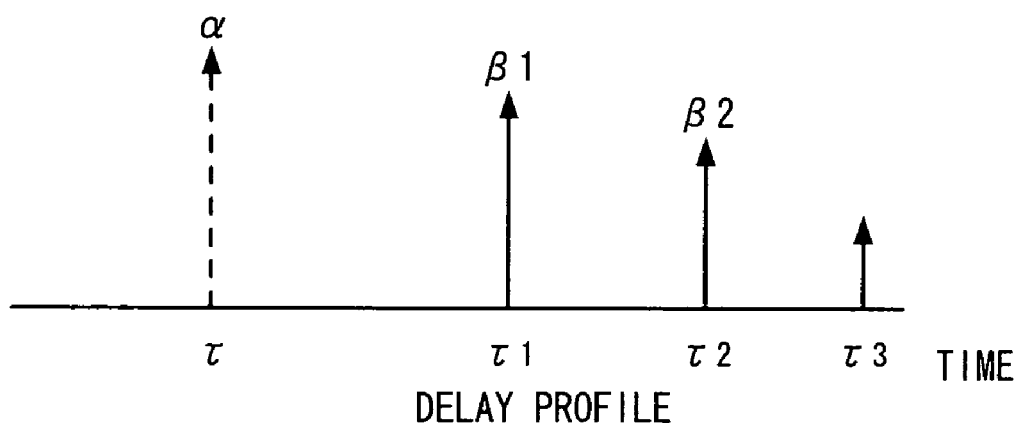
DELAY PROFILE

FIG. 12
(A) 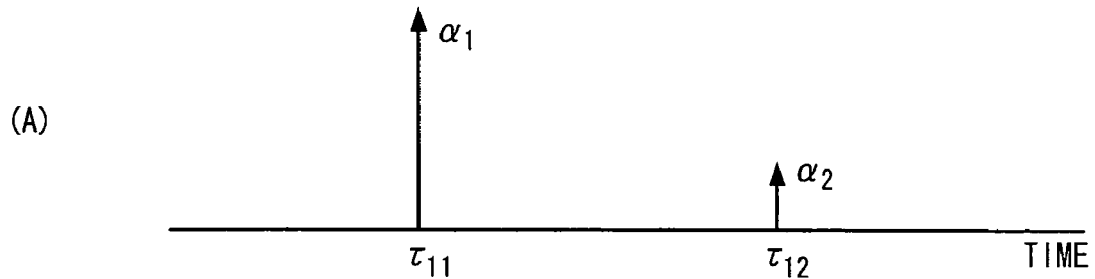
DELAY PROFILE OF BTS1
(B) 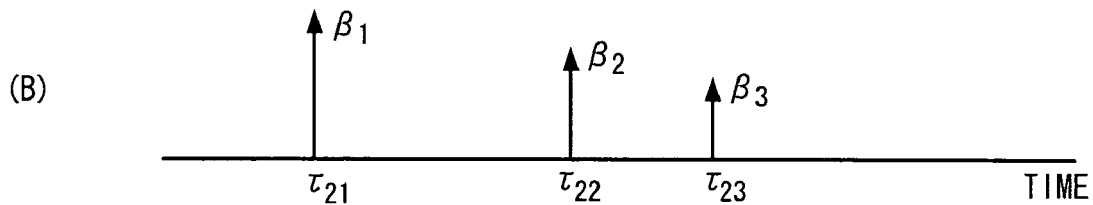
DELAY PROFILE OF BTS2
ADJUST DELAY AND COMBINE
(C) 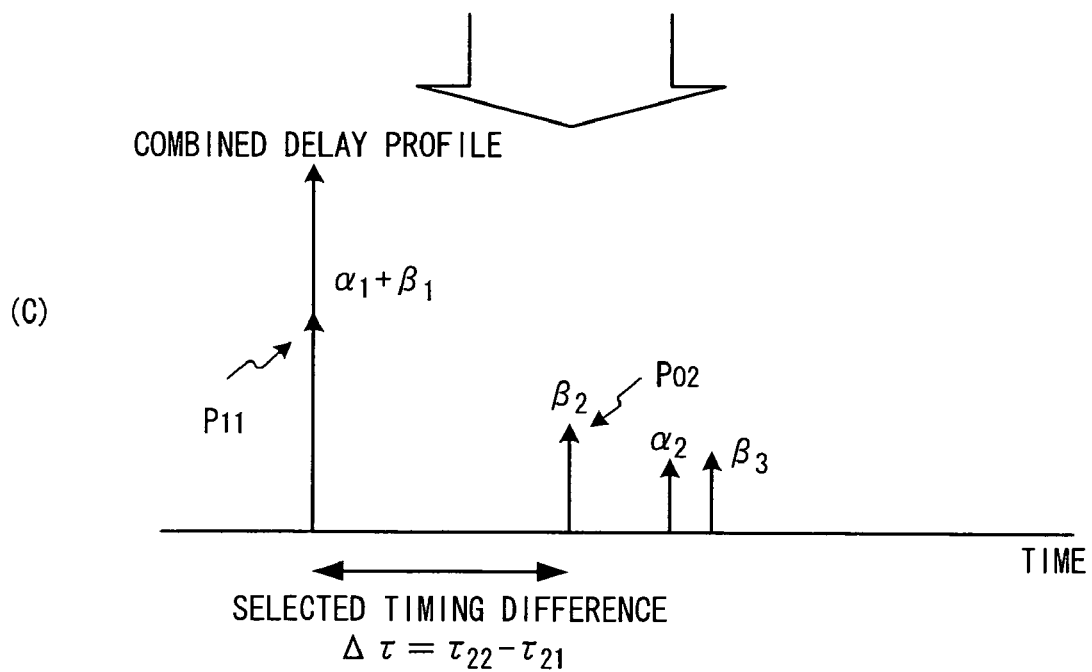
COMBINED DELAY PROFILE
SELECTED TIMING DIFFERENCE
$\Delta \tau = \tau_{22} - \tau_{21}$

DELAY PROFILE

INTERFERENCE REDUCTION APPARATUS AND METHOD

BACKGROUND OF THE INVENTION

This invention relates to an apparatus and method for reducing interference. More particularly, the invention relates to an interference reduction apparatus and method for reducing interference that arrives via paths from adjacent cells.

Spread-spectrum communication schemes are utilized widely as the most fundamental technique for mobile communications. With a direct sequence (DS) scheme, which is the simplest model of spread-spectrum communication, an information signal of period T to be transmitted is spread-spectrum modulated by being multiplied by a spreading code of chip period Tc (T/Tc=spreading ratio), whereby the spectrum of the signal is spread before the signal is transmitted to the receiving side. On the receiving side the signal that has been spread over a wide frequency range is subjected to despreading to detect the signal component. Despreading is carried out by demodulating the receive signal by multiplying it by a code that is identical with the spreading code.

Many reflected waves in addition to direct waves exist in the signal received on the receiving side. A technique for detecting the correct signal component in such a multipath environment by combining received signals having various different delay-time differences has been established in the form of a RAKE receiver. Specifically, a RAKE receiver, which focuses on the fact that there is an information component contained not only in direct waves but also in delayed waves, despreads the information component, which is present in the delayed waves of each path, based upon the delay timing (path timing) of this path, performs maximal combining upon bringing the timings of the despread signals on respective paths into conformity and outputs the result.

With the conventional RAKE receiver, the timings at which signals arrive via multiple paths are detected by a searcher, each timing is input to a finger corresponding to the particular path, each finger performs despreading at the timing input thereto, and a RAKE combiner combines the despread signals obtained by respective ones of the fingers, thereby demodulating the desired signal.

FIG. 23 is a block diagram of a RAKE receiver according to the prior art. A radio receiver 2 converts a high-frequency signal, which has been received by an antenna 1, to a baseband signal by a frequency conversion, applies quadrature demodulation and inputs the resultant signal to an AD converter 4 via an AGC amplifier 3. The AD converter 4 converts the quadrature-demodulated signal to digital data, and a path searcher 5 calculates the correlation between the received spread-spectrum signal and the spreading code that was used on the transmitting side and searches for the delay timing on each path of the multipath system based upon the result of the correlation calculation. Fingers 6a to 6n are provided in correspondence with respective ones of the paths of the multipath system and each finger has a despreader and a delay circuit, not shown. A timing generator 7 inputs the delay timings of the paths to the despreaders of respective ones of the fingers 6a to 6n as despreading timings, and inputs delay times, which are for bringing into agreement the timings of the despread signals that are output from the despreading units, to the delay circuits of respective ones of the fingers 6a to 6n. The RAKE combiner 8 performs maximal ratio combining of the despread signals that are output from the fingers 6a to 6n and outputs the result to a channel codec (not shown), which is the next stage.

In such a RAKE receiver, each finger performs despreading at the delay timing of the corresponding path. However, signals on other paths at this timing are contained in the despread signal as interference. If the signal components of these other paths, namely the interference components, can be reduced, the BER (Bit Error Rate) can be improved and reception of excellent quality becomes possible.

To achieve this, an interference reduction method referred to as the MIXR (Multipath Interference exchange Reduction) method has been proposed by the present applicant (see the specification of JP 2003-133999A). This interference reduction method reduces interference by using a MICT (Multipath Interference Correlative Timing) signal obtained by performing despreading at the MICT, which is a special timing.

FIGS. 24 to 26 are diagrams useful in describing the MIXR method. Assume that a CDMA mobile station MS receives signals from a base station BTS1 via two paths, as shown in FIG. 24. The signal timings of the two paths received by the CDMA mobile station MS are as shown in FIG. 25. The delay profile of the two paths is assumed to be as shown in FIG. 26. In FIG. 25, A, B, C, . . . , Y, Z are labels representing signals at the timings of respective ones of the paths, in which A is a signal at a correct despreading timing. Let $\alpha_1$, $\alpha_2$ represent channel characteristic values of paths 1, 2, respectively, let $t_1$, $t_2$ represent the despreading timings, and let $x_1$, $x_2$ represent signals obtained by despreading at these timings. Accordingly, if a special timing $t_0 = t_1 - (t_2 - t_1)$ is decided, i.e., if a time $t_0 (= 2t_1 - t_2)$ that is $(t_2 - t_1)$ earlier than $t_1$ is determined and the signal obtained by despreading at this timing $t_0$ is represented by $x_0$, then $x_1$, $x_2$ can be expressed as follows:

$$x_1 = \alpha_1 S + \alpha_2 I_Z + n_1 \quad (1)$$

$$x_0 = \alpha_1 I_Z + \alpha_2 I_Y + n_0 \quad (2)$$

where $\alpha_1 S$ represents a desired signal obtained by despreading the receive signal on path 1 from timing $t_1$, $\alpha_2 I_Z$ represents interference obtained by despreading the receive signal on path 2 from timing $t_1$, $\alpha_1 I_Z$ represents a signal obtained by despreading the receive signal on path 1 from timing $t_0$, $\alpha_2 I_Y$ represents a signal obtained by despreading the receive signal on path 2 from timing $t_0$, and $n_1$, $n_0$ each represent noise. Although $x_0$ is a signal that is the result of performing despreading at a timing at which the desired signal S is not obtained, $\alpha_1 I_Z$ is contained in $x_0$. In other words, it will be understood that $x_0$ contains a signal having correlation with the interference component $\alpha_2 I_Z$ of $x_1$. In this sense, a signal such as $x_0$ is referred to as a MICS (Multipath Interference Correlative Signal) with respect to paths 1 and 2, and timing such as $t_0$ is referred to as the aforementioned MICT (Multipath Interference Correlative Timing) with respect to paths 1 and 2.

Since $x_0$ has a correlation with the interference component of $x_1$, the interference component of $x_1$ can be diminished by multiplying $x_0$ by a suitable coefficient r and subtracting the product from $x_1$. What this means is that if the coefficient r is decided so as to completely eliminate the interference component $I_Z$ contained in $x_1$, the other interference component $I_Y$ contained in $x_0$ will be increased and, as a consequence, the magnitude of noise overall will increased. The optimum coefficient r is one that is decided in such a manner that the power of overall interference is minimized while leaving the original interference $I_Z$. The coefficient r that will minimize interference components is found as follows:

$$\langle |x_1 - rx_0|^2 \rangle \qquad (3)$$
$$= \langle |x_1|^2 \rangle + |r|^2 \langle |x_0|^2 \rangle - 2\text{Re}(\langle rx_0 x_1^* \rangle)$$
$$= \langle |x_0|^2 \rangle \left( |r|^2 - \frac{2\text{Re}(\langle rx_0 x_1^* \rangle)}{\langle |x_0|^2 \rangle} \right) + \langle |x_1|^2 \rangle$$
$$= \langle |x_0|^2 \rangle \left| r - \frac{\langle x_0^* x_1 \rangle}{\langle |x_0|^2 \rangle} \right|^2 + \langle |x_1|^2 \rangle - \frac{|\langle x_0^* x_1 \rangle|^2}{\langle |x_0|^2 \rangle}$$
$$= (|\alpha_1|^2 I^2 + |\alpha_2|^2 I^2 + n_0^2)$$
$$\left| \left( r - \frac{\alpha_1^* \alpha_2 I^2}{(|\alpha_1|^2 I^2 + |\alpha_2|^2 I^2 + n_0^2)} \right) \right|^2 +$$
$$|\alpha_1 S|^2 + |\alpha_2|^2 I^2 + n_1^2 - \frac{|\alpha_1 \alpha_2|^2 I^4}{(|\alpha_1|^2 I^2 + |\alpha_2|^2 I^2 + n_0^2)}$$

where < > represents time averaging.
We write the following:

$$\langle |I_Z|^2 \rangle = \langle |I_Y|^2 \rangle = I^2, \langle |n_0|^2 \rangle = n_0^2, \langle |n_1|^2 \rangle = n_1^2$$

It will be understood from Equation (3) that the sum of interference and noise will be minimized when the following holds:

$$r = \frac{\langle x_0^* x_1 \rangle}{\langle |x_0|^2 \rangle} = \frac{\alpha_1^* \alpha_2}{(|\alpha_1|^2 + |\alpha_2|^2 + n_0^2/I^2)} \qquad (4)$$

After reduction, the average value $$|\alpha_2|^2 I^2 + n_1^2 \qquad (5)$$

of interference and noise before reduction in Equation (1) becomes as follows from Equation (3):

$$|\alpha_2|^2 I^2 + n_1^2 - \frac{|\alpha_1 \alpha_2|^2 I^4}{(|\alpha_1|^2 I^2 + |\alpha_2|^2 I^2 + n_0^2)} \qquad (6)$$

and thus it will be understood that the average value of interference and noise is diminished.

Thus, MIXR is a method of reducing overall interference power by replacing part of the interference signal contained in a despread signal with another interference signal.

FIG. 27 is a block diagram of a RAKE receiver that employs the MIXR interference reduction method. A radio receiver (not shown) converts a received high-frequency signal to a baseband signal by a frequency conversion, applies quadrature demodulation and inputs the resultant signal to an AD converter 11. The AD converter 11 converts the input signal to digital data. A path searcher 12 calculates the correlation between the received spread-spectrum signal and the spreading code that was used on the transmitting side and searches for delay timings $t_1$, $t_2$ (see FIG. 26) of respective ones of the paths of the multipath system based upon the result of the correlation calculation. A timing generator 13 for reducing interference calculates timing ($2t_1-t_2$) for interference reduction from the delay timings $t_1$, $t_2$, and a despreading timing decision unit 14 inputs the despreading timings $t_1$, $t_0(t_0=2t_1-t_2)$ to fingers $15_0$, $15_1$, respectively. The finger $15_0$ performs despreading at the timing $t_0$ and outputs $x_0$ of Equation (2), and the finger $15_1$ performs despreading at the timing $t_1$ and outputs $x_1$ of Equation (1). A synchronous detector/RAKE combiner 16 synchronously detects the despread signals that enter from the fingers, then combines the detected signals upon weighting them (multiplying by the coefficient r) and outputs the resultant signal to a channel codec, which is not shown.

The foregoing is a case where the interference component only on path 1 of channel characteristic $\alpha_1$ is eliminated. However, it can also be so arranged that the interference component on path 2 is eliminated simultaneously and subjected to RAKE combining. Let $t_1$, $t_2$ denote the despreading timings of paths 1, 2, respectively, as shown in FIG. 28, and let $x_1$, $x_2$ represent the signals obtained by despreading at respective ones of these timings. Further, if a special timing $t_3=t_2+(t_2-t_1)=2t_2-t_1$ is decided, i.e., if a time $t_3$ ($=2t_2-t_1$) that is ($t_2-t_1$) later than $t_2$ is determined and the signal obtained by despreading at this timing $t_3$ is represented by $x_3$, then $x_2$, $x_3$ can be expressed as follows:

$$x_2 = \alpha_2 S + \alpha_1 I_B + n_3 \qquad (7)$$

$$x_3 = \alpha_2 I_B + \alpha_1 I_C + n_4 \qquad (8)$$

where $\alpha_2 S$ represents a desired signal obtained by despreading the receive signal on path 2 from timing $t_2$, $\alpha_1 I_B$ represents interference obtained by despreading the receive signal on path 1 from timing $t_2$, $\alpha_2 I_B$ represents a signal obtained by despreading the receive signal on path 2 from timing $t_3$, $\alpha_1 I_C$ represents a signal obtained by despreading the receive signal on path 1 from timing $t_3$, and $n_3$, $n_4$ each represent noise. Although $x_3$ is a signal that is the result of performing despreading at a timing at which the desired signal S is not obtained, $\alpha_2 I_B$ is contained in $x_3$. In other words, it will be understood that $x_3$ contains a signal having correlation with the interference component $\alpha_1 I_B$ of $x_2$. Since $x_3$ has a correlation with the interference component of $x_2$, the interference component of $x_2$ can be diminished by multiplying $x_3$ by a suitable coefficient r' and subtracting the product from $x_2$.

FIG. 29 is a block diagram of a RAKE receiver for eliminating the interference component contained in path 1 of channel characteristic $\alpha_1$, simultaneously eliminating the interference component contained in path 2 and performing RAKE-combining. A radio receiver (not shown) converts a received high-frequency signal to a baseband signal by a frequency conversion, applies quadrature demodulation and inputs the resultant signal to the AD converter 11. The latter converts the input signal to digital data. The path searcher 12 calculates the correlation between the received spread-spectrum signal and the spreading code that was used on the transmitting side and searches for delay timings $t_1$, $t_2$ (see FIG. 28) of respective ones of the paths of the multipath system based upon the result of the correlation calculation. The timing generator 13 for reducing interference calculates timings ($2t_1-t_2$), ($2t_2-t_1$) for interference reduction from the delay timings $t_1$, $t_2$, and the despreading timing decision unit 14 inputs the despreading timings $t_0$ ($=2t_1-t_2$)$t_1$, $t_2$, $t_3$ ($=2t_2-t_1$) to fingers $15_0$, $15_1$, $15_2$, $15_3$, respectively. The finger $15_0$ performs despreading at the timing $t_0$ and outputs $x_0$ of Equation (2), the finger $15_1$ performs despreading at the timing t, and outputs $x_1$ of Equation (1), the finger $15_2$ performs despreading at the timing $t_2$ and outputs $x_2$ of Equation (7), and the finger $15_3$ performs despreading at the timing $t_3$ and outputs $x_3$ of Equation (8).

The synchronous detector/RAKE combiner 16 synchronously detects the despread signals that enter from the fingers, then combines the detected signals upon weighting them (multiplying by the coefficients r, r') and outputs the resultant signal to a channel codec, which is not shown.

In a case where multipath within the cell of a base station BTS1 with which communication is currently in progress is the principal factor in interference, i.e., in a case where mobile station MS is near the location of the communicating base station BTS1, the technique using the delay profile within the cell of the communicating base station BTS1 is an effective method of reducing interference, as set forth above.

However, when the mobile station MS moves to the edge of the cell, interference from an adjoining cell becomes a major factor in degradation of characteristics. Even if multipath interference within the cell of the base station with which communication is currently in progress is eliminated, a large reduction in interference is not achieved overall. For example, in a case where one path is viewed from base station BTS1, two paths from base station BTS2 and the mobile station MS is communicating with the base station BTS1, as shown in FIGS. 30 and 31, the interference source is the signal from the adjacent base station BTS2. In such case, interference cannot be eliminated using the methods according to the prior art.

SUMMARY OF THE INVENTION

Accordingly, an object of the present invention is to reduce interference from an adjacent base station.

Another object of the present invention is to perform despreading at a timing that reduces interference from an adjacent base station in addition to the timings of multiple path, and combine the results of despreading to thereby reduce interference from the adjacent base station.

Still another object of the present invention is to decide a despreading timing that reduces interference from an adjacent base station.

A further object of the present invention is to take multipath from a base station with which communication is currently in progress or multipath from an adjacent base station into consideration and decide a despreading timing that eliminates interference effectively.

According to the present invention, the foregoing objects are attained by providing an interference reduction apparatus for diminishing an interference component contained in a despread signal obtained by despreading a spread-spectrum signal.

A first interference reduction apparatus according to the present invention comprises: first timing deciding means for deciding an interference-reducing timing that is for diminishing an interference component arriving from an adjacent base station; second timing deciding means for deciding timing of multipath from a base station with which communication is currently in progress; means for deciding a plurality of despreading timings, at which despreading is performed, from each of the aforesaid timings; despreading means for despreading the spread-spectrum signal at each of the despreading timings; and combining means for RAKE-combining a plurality of results of despreading.

A second interference reduction apparatus according to the present invention comprises: first timing deciding means for deciding an interference-reducing timing that is for diminishing an interference component arriving from an adjacent base station; second timing deciding means for deciding timing of multipath from a base station with which communication is currently in progress; means for deciding a plurality of delay timings, which are for delaying the spread-spectrum signal, based upon each of the aforesaid timings; delaying/combining means for delaying the spread-spectrum signal by each of the delay timings and combining the resultant signals into a combined signal; and despreading means for despreading the combined signal.

In the first and second interference reduction apparatus, the first timing deciding means includes peak detecting means for calculating autocorrelation of a receive signal and detecting a signal peak; and an interference-reducing timing decision unit for deciding the interference-reducing timing using timing of the signal peak and the timing of multipath.

A third interference reduction apparatus according to the present invention comprises: delay profile calculating means for calculating delay profiles from each of a communicating base station and peripheral base station; means for shifting, superimposing and combining each of the delay profiles to obtain a combined delay profile; timing deciding means for deciding an interference-reducing timing using path timing of the communicating base station and a timing difference between two timings of the combined delay profile at which the sum of combined powers will be largest; means for deciding a plurality of despreading timings, which are for despreading the spread-spectrum signal, from the path timing of the communication base station and the interference-reducing timing; despreading means for despreading the spread-spectrum signal at each of the despreading timings; and combining means for combining a plurality of results of despreading.

In accordance with the present invention, the foregoing objects are attained by providing an interference reduction method in a CDMA receiving apparatus for diminishing an interference component contained in a despread signal obtained by despreading a spread-spectrum signal.

A first interference reduction method according to the present invention comprises the steps of: deciding an interference-diminishing timing that is for diminishing an interference component arriving from an adjacent base station; deciding timing of multipath from a base station with which communication is currently in progress; deciding a plurality of despreading timings, at which despreading is performed, from each of the aforesaid timings; despreading the spread-spectrum signal at each of the despreading timings; and combining a plurality of results of despreading to thereby diminish the interference component.

A second interference reduction method according to the present invention comprises the steps of: deciding an interference-reducing timing that is for diminishing an interference component arriving from an adjacent base station; deciding timing of multipath from base station with which communication is currently in progress; deciding a plurality of delay timings, which are for delaying the spread-spectrum signal, based upon each of the aforesaid timings; delaying the spread-spectrum signal by each of the delay timings and combining the resultant signals into a combined signal; and despreading the combined signal to thereby diminish the interference component.

In the first and second interference reduction methods, the step of deciding an interference-reducing timing includes the steps of calculating autocorrelation of a receive signal and detecting a signal peak; and deciding the interference-reducing timing using timing of the peak and the timing of multipath.

A third interference reduction method according to the present invention comprises the steps of: calculating a delay profile from a base station with which communication is currently in progress and a delay profile from a peripheral base station; shifting, superimposing and combining each of the delay profiles to obtain a combined delay profile; obtaining a timing difference between two timings of the combined delay profile at which the sum of combined powers will be largest; deciding an interference-reducing timing using the timing difference and path timing of the base station with which communication is currently in progress; deciding a plurality of despreading timings, which are for despreading the spread-spectrum signal, from the path timing of the base station with which communication is currently in progress and the interference-reducing timing; despreading the spread-spectrum signal at each of the despreading timings; and combining a plurality of results of despreading to thereby diminish the interference component.

In accordance with the present invention, the foregoing objects are attained by providing a method of deciding despreading timing for reducing interference in a CDMA receiving apparatus for diminishing an interference component by despreading a received spread-spectrum signal at an interference-reducing timing.

A first method of deciding despreading timing for reducing interference according to the present invention comprises the steps of: calculating autocorrelation of the spread-spectrum signal and detecting a signal peak; and deciding despreading timings for reducing interference by adding and subtracting timing of the signal peak to and from timing of multipath from a base station with which communication is currently in progress.

A second method of deciding despreading timing for reducing interference according to the present invention comprises the steps of: calculating a delay profile from an adjacent base station; and deciding despreading timings for reducing interference by adding and subtracting a timing difference of the delay profile to and from timing of multipath from a base station with which communication is currently in progress.

In accordance with the present invention, even if a mobile station moves to a cell boundary and interference from an adjacent base station occurs, this interference can be reduced.

In accordance with the present invention, despreading is performed at a timing that reduces interference from an adjacent base station in addition to the timings of multiple paths, and results of despreading are RAKE-combined. As a result, it is possible to reduce interference from the adjacent base station.

In accordance with the present invention, an autocorrelation of a spread-spectrum signal or a delay profile from an adjacent base station is obtained, despreading timing for reducing interference from the adjacent base station is decided based upon the autocorrelation or the delay profile, and despreading is performed at this timing. As a result, interference from the adjacent base station can be reduced.

In accordance with the present invention, it is possible to effectively diminish an interference component of large power contained in a desired signal.

Other features and advantages of the present invention will be apparent from the following description taken in conjunction with the accompanying drawings.

BRIEF DESCRIPTION OF THE DRAWINGS

FIG. 8 shows examples of delay profiles from an adjacent cell;

FIG. 12 illustrates further examples of delay profiles in a case where there are two multiple paths $\alpha_1, \alpha_2$ from a base station BTS1 with which communication is currently in progress and three multiple paths $\beta_1, \beta_2, \beta_3$ from an adjacent base station BTS2;

DESCRIPTION OF THE PREFERRED EMBODIMENTS

(A) Overview of the Present Invention

An interference reduction apparatus according to the present invention applied to a CDMA receiver for diminishing an interference component contained in a despread signal obtained by despreading a spread-spectrum signal comprises: means for deciding an interference-reducing timing that is for diminishing an interference component arriving from an adjacent base station; means for deciding timing of multiple paths from a base station with which communication is currently in progress; means for deciding a plurality of despreading timings, at which despreading is performed, from each of the aforesaid timings; means for despreading the spread-spectrum signal at each of the despreading timings; and combining means for combining a plurality of results of despreading and diminishing the interference component. The means for deciding interference-reducing timing calculates autocorrelation of the receive signal, detects the peak of the signal and add and subtracts the timing of multiple paths to and from the timing of the peak to thereby decide the interference-reducing timings.

(B) Principles of the Present Invention

Figure 1:
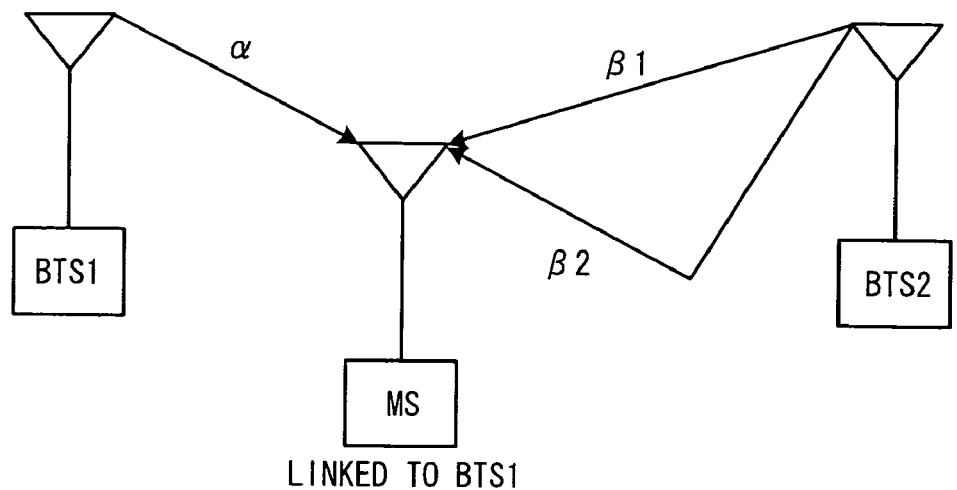
FIG. 1 is a diagram useful in describing the relationship between positions of base stations and a mobile station.
Figure 2:
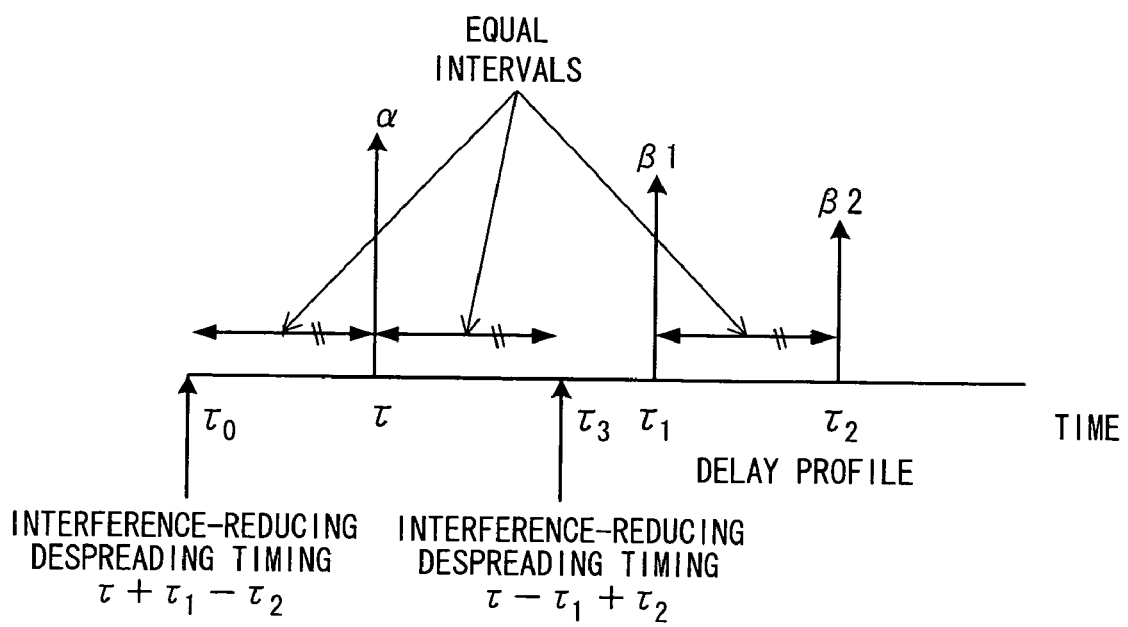
FIG. 2 is a delay profile from each base station.

FIGS. 1 and 2 are diagrams useful in describing the principles of the present invention, in which FIG. 1 is a diagram useful in describing the relationship between positions of base stations and a mobile station, and FIG. 2 is a delay profile from each base station.

In an environment in which a mobile station MS moves to the boundary of a cell and interference from a peripheral cell becomes predominant, the timings that can be used effectively in reducing interference from the peripheral cell are those obtained by adding and subtracting a timing difference $(\tau_2-\tau_1)$ between multiple paths from the peripheral cell to and from the path timing $\tau$ of the mobile station's own cell. For example, consider an environment in which, as shown in FIG. 1, signals arrive at the mobile station MS from a base station BTS1 via one path (the channel characteristic of which is $\alpha$) and from a base station BTS2 via two paths (the channel characteristics whereof are $\beta_1, \beta_2$), and the mobile station MS is currently communicating with the base station BTS1. As shown in FIG. 2, the timings that can be used effectively to reduce interference in such an environment are $\tau_0=\tau-(\tau_2-\tau_1)$, $\tau_3=\tau+(\tau_2-\tau_1)$, where $\tau$ represents the path timing (signal arrival time) from the communicating base station BTS1 and $\tau_1, \tau_2$ represent the two path timings (signal arrival times) from the adjacent base station BTS2.

Figure 3:
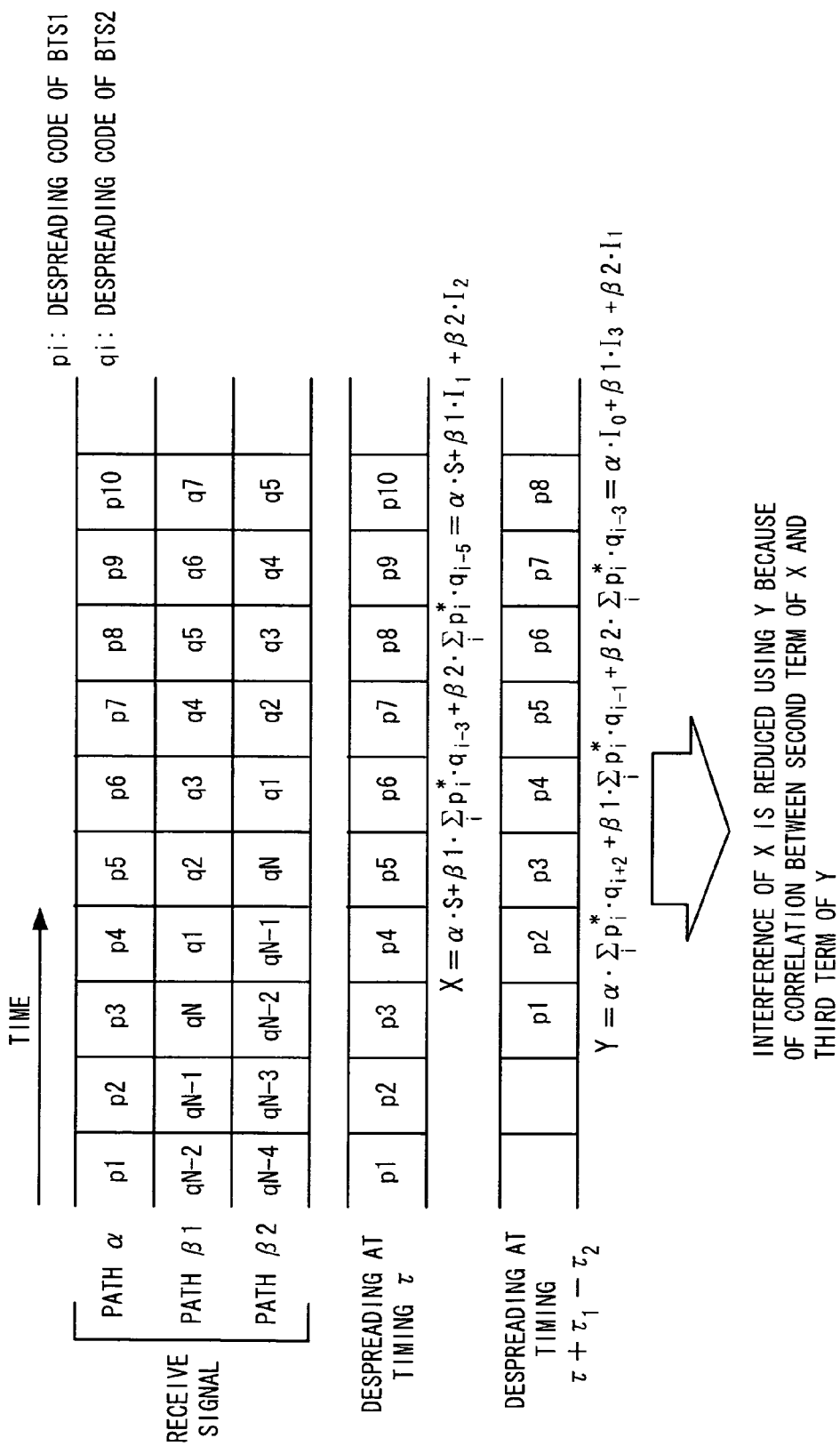
FIG. 3 illustrates the result of despreading at a timing of $\tau-(\tau_2-\tau_1)$.

If despreading has been performed at the timing $\tau$, then the signal destined for the mobile station MS from the communicating base station BTS1 is despread and becomes the desired signal. Signals from the base station BTS2, however, constitute interference and cause a decline in communication quality. In order to reduce interference from base station BTS2, the results of despreading at timings $\tau\pm(\tau_2-\tau_1)$ can be used. FIG. 3 illustrates an example in which the timing $\tau-(\tau_2-\tau_1)$ is utilized. Let the timing difference between path $\alpha$ and path $\beta_1$ be three chips, let the timing difference between path $\alpha$ and path $\beta_2$ be five chips, let $p_1, p_2, \ldots, p_N$ represent the spreading codes of the communicating base station BTS1, and let $q_1, q_2, \ldots, q_N$ represent the spreading codes of the adjacent base station BTS2.

If a spread-spectrum signal received by a CDMA receiver is despread at the timing $\tau$, then a despread signal X indicated by the following equation is obtained:

$$X = \alpha S + \beta_1 \sum_i p_i^* \cdot q_{i-3} + \beta_2 \sum_i p_i^* \cdot q_{i-5} = \alpha \cdot S + \beta_1 I_1 + \beta_2 I_2 \quad (9)$$

where S represents the desired signal. Similarly, if a spread-spectrum signal is despread at the timing $\tau-(\tau_2-\tau_1)$, then a despread signal Y indicated by the following equation is obtained:

$$Y = \alpha \sum_i p_i^* \cdot p_{i+2} + \beta_1 \sum_i p_i^* \cdot q_{i-1} + \beta_2 \sum_i p_i^* \cdot q_{i-3} \quad (10)$$
$$= \alpha \cdot I_0 + \beta_1 I_3 + \beta_2 I_1$$

If Equations (9) and (10) are compared, it will be understood that a component identical with the interference $\beta_1 I_1$ contained in the desired signal X that has been despread at the timing $\tau$ is contained in the signal Y that has been despread at the timing $\tau-(\tau_2-\tau_1)$. The interference $\beta_1 I_1$ can be reduced using the signal Y. In other words, a component $I_1$ that is identical with the interference $\beta_1 I_1$ from path $\beta_1$ of base station BTS2 when despreading has been performed at timing $\tau$ can be produced by performing despreading at timing $\tau_0=\tau-(\tau_2-\tau_1)$, and the interference can be reduced by applying appropriate weighting.

Thus, according to the present invention, the right side of Equation (10) is multiplied by a weight w and the product is subtracted from the large interference $$\beta_2 I_2 + \beta_1 I_1$$

indicated on the right side of Equation (9), whereby a conversion is effected to a small amount of interference $$\beta_2 I_2 + \beta_1 I_1 - w(\beta_2 I_1 + \beta_1 I_3 + \alpha I_0)$$

to reduce the total amount of interference power. Here $\alpha$ represents the channel characteristic of the path from the communicating base station BTS1, $\beta_1, \beta_2$ represent the channel characteristics of the two paths from the base station BTS2, $I_1, I_2, I_3$ represent correlation values (interference) of components obtained by despreading signals from the base station BTS2 by the spreading codes $p_1, p_2, \ldots, p_N$ at timing differences $\tau-\tau_1, \tau-\tau_2, \tau-2\tau_1+\tau_2$, respectively, and $I_0$ denotes a correlation value (interference) of a component obtained by despreading a signal from the communicating base station BTS1 by the spreading codes $p_1, p_2, \ldots, p_N$ at timing difference $-\tau_1+\tau_2$.

Figure 4:
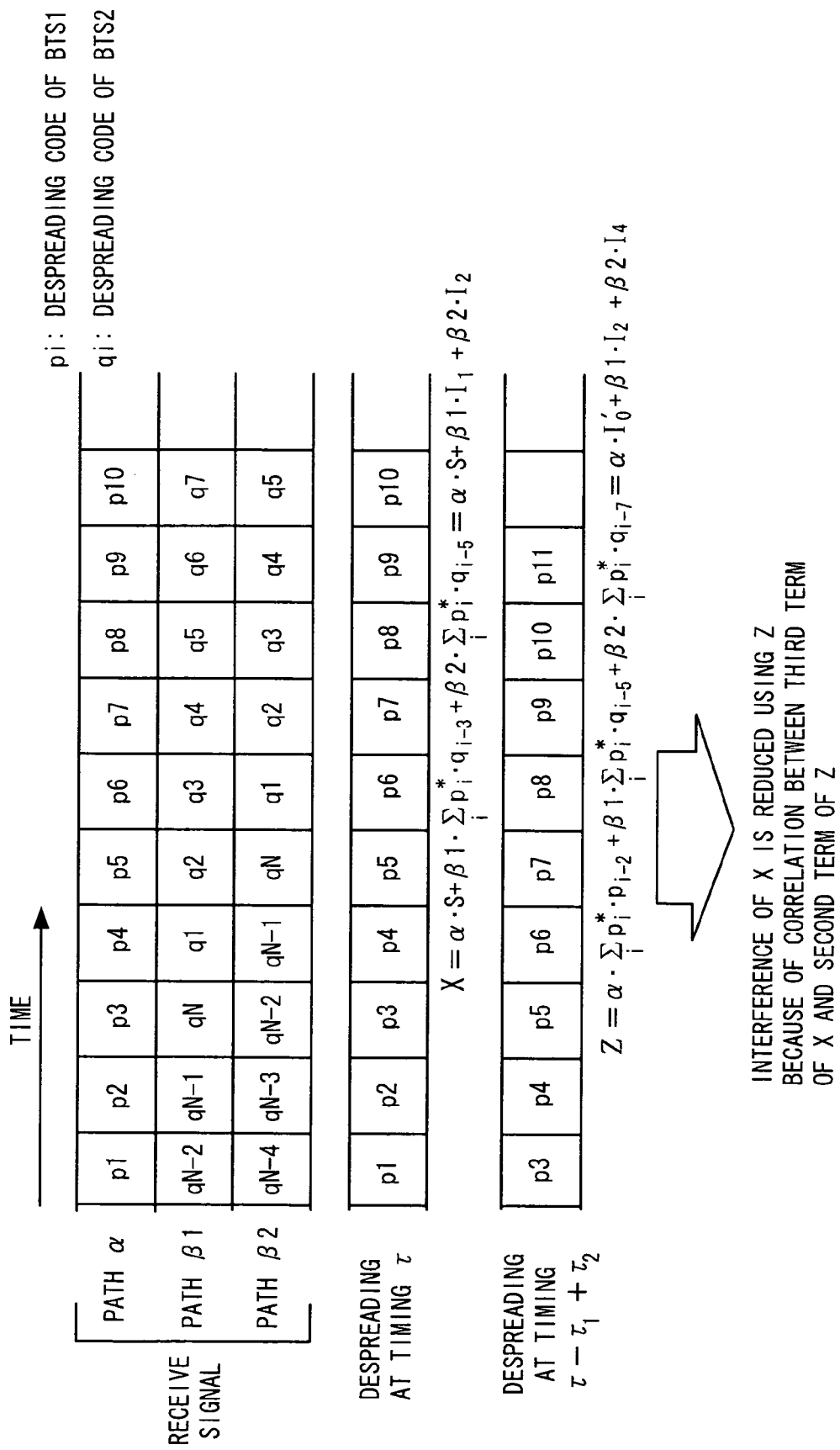
FIG. 4 illustrates the result of despreading at a timing of $\tau+(\tau_2-\tau_1)$.

FIG. 4 illustrates an example in which the timing $\tau+(\tau_2-\tau_1)$ is utilized. If a spread-spectrum signal received by a CDMA receiver is despread at the timing $\tau$, then a despread signal X indicated by Equation (9) is obtained. If a spread-spectrum signal is despread at the timing $\tau+(\tau_2-\tau_1)$, then a despread signal Z indicated by the following equation is obtained:

$$Z = \alpha \sum_i p_i^* \cdot p_{i-2} + \beta_1 \sum_i p_i^* \cdot q_{i-5} + \beta_2 \sum_i p_i^* \cdot q_{i-7} = \quad (11)$$
$$\alpha \cdot I_0' + \beta_1 I_2 + \beta_2 I_4$$

If Equations (9) and (11) are compared, it will be understood that a component identical with the interference $\beta_2 I_2$ contained in the desired signal X that has been despread at the timing $\tau$ is contained in the signal Z that has been despread at the timing $\tau+(\tau_2-\tau_1)$. The interference $\beta_2 I_2$ can be reduced using the signal Z. In other words, a component $I_2$ that is identical with the interference $\beta_2 I_2$ from path $\beta_2$ of base station BTS2 when despreading has been performed at timing $\tau$ can be produced by performing despreading at timing $\tau_0=\tau+(\tau_2-\tau_1)$, and the interference can be reduced by applying appropriate weighting.

Thus, according to the present invention, the right side of Equation (11) is multiplied by a weight w' and the product is subtracted from the large interference $$\beta_2 I_2+\beta_1 I_1$$

indicated on the right side of Equation (9), whereby a conversion is effected to a small amount of interference $$\beta_2 I_2+\beta_1 I_1-w'(\beta_2 I_4+\beta_1 I_2+\alpha I_0')$$

to reduce the total amount of interference power. Here $I_1$, $I_2$, $I_4$ represent correlation values (interference) of components obtained by despreading signals from the base station BTS2 by the spreading codes $p_1, p_2, \ldots, p_N$ at timing differences $\tau-\tau_1$, $\tau-\tau_2$, $\tau-2\tau_2+\tau_1$, respectively, and $I_0'$ denotes a correlation value (interference) of a component obtained by despreading a signal from the communicating base station BTS1 by the spreading codes $p_1, p_2, \ldots, p_N$ at timing difference $-\tau_2+\tau_1$.

(C) Despreading Timing for Eliminating Interference in the First Embodiment

In accordance with the description of operating principles set forth above, when the two paths $\beta_1$, $\beta_2$ from the base station BTS2 to the mobile station MS exist, the despreading timings for eliminating interference are $$\tau_0=\tau-(\tau_2-\tau_1), \tau_3=\tau+(\tau_2-\tau_1).$$

The above-mentioned timing $\tau$ can be acquired by searching the correlation between a spread-spectrum signal received by a CDMA receiver and the spreading codes $p_1, p_2, \ldots, p_N$ of the transmitter by a path searcher having the construction of a matched filter. Accordingly, if path timing difference $\Delta\tau$ $(=\tau_2-\tau_1)$ is found, the despreading timings $\tau_0=\tau-(\tau_2-\tau_1)$, $\tau_3=\tau+(\tau_2-\tau_1)$ for eliminating interference will be obtained.

Figure 5:
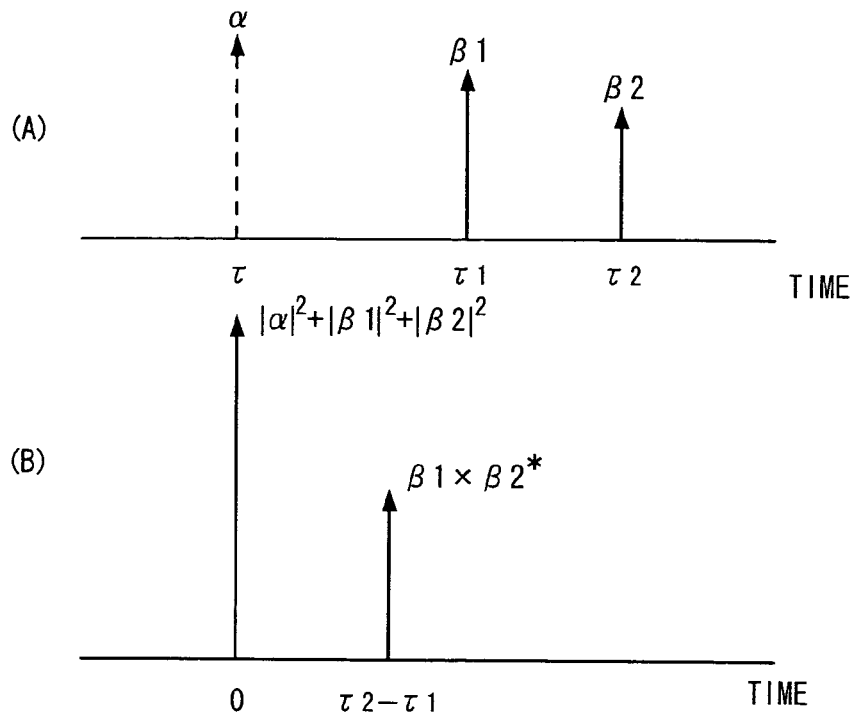
FIG. 5 shows examples of delay profiles from base stations.
Figure 6:
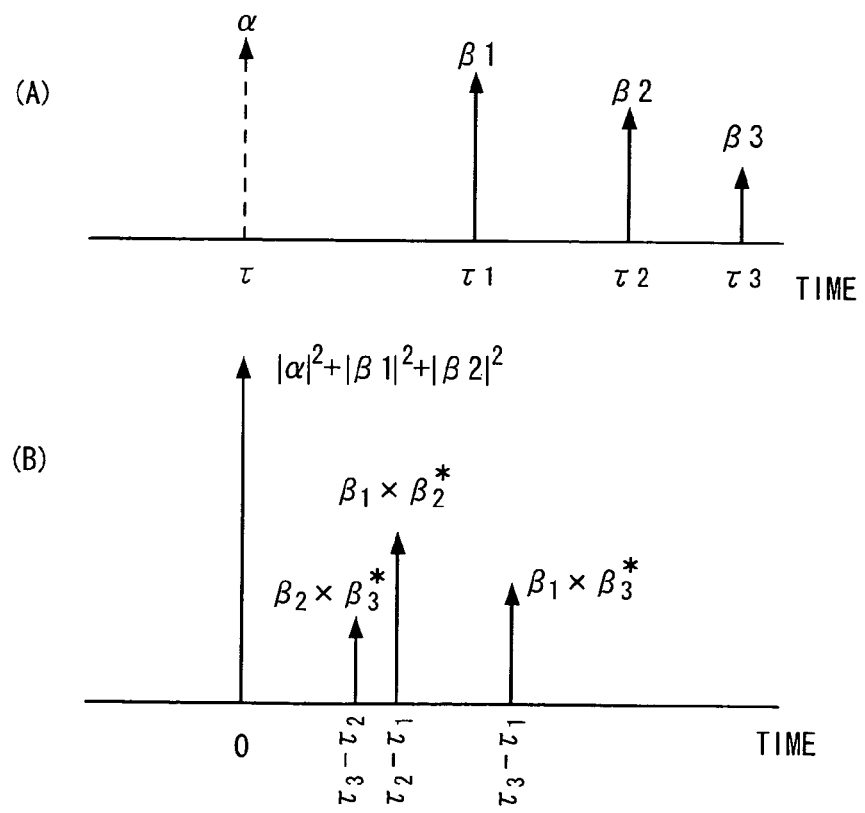
FIG. 6 shows other examples of delay profiles from base stations.

Assume that a delay profile from each base station is as illustrated at (A) of FIG. 5. If the autocorrelation of a spread-spectrum signal received by a CDMA receiver is calculated, the autocorrelation values will indicate peaks at t=0 and t=$\tau_2-\tau_1$. Accordingly, if a peak timing other than t=0 is obtained, then this timing will be the path timing difference $\Delta\tau$ $(=\tau_2-\tau_1)$. Furthermore, assume that three paths $\beta_1$, $\beta_2$, $\beta_3$ from the base station BTS2 to the mobile station MS exist and that the delay profile is as indicated at (A) in FIG. 6. In this case the autocorrelation values will indicate peaks at t=0, $\tau_2-\tau_1$, $\tau_3-\tau_2$, $\tau_3-\tau_1$, as indicated at (B) in FIG. 6. Therefore, if the peak timing having the largest peak value other than the peak timing at t=0 is selected and adopted as the path timing difference $\Delta\tau$ $(=\tau_2-\tau_1)$, then the largest interference component that arrives from the adjacent base station can be reduced. Further, the foregoing relates to a case where there is one adjacent base station. In a case where there are two or more adjacent base stations, however, the largest interference component that arrives from the plurality of base stations can be reduced if a similar autocorrelation is calculated, the timing of the largest peak selected and this timing adopted as the path timing difference $\Delta\tau$.

(D) Principal Components of CDMA Receiver of the First Embodiment

Figure 7:
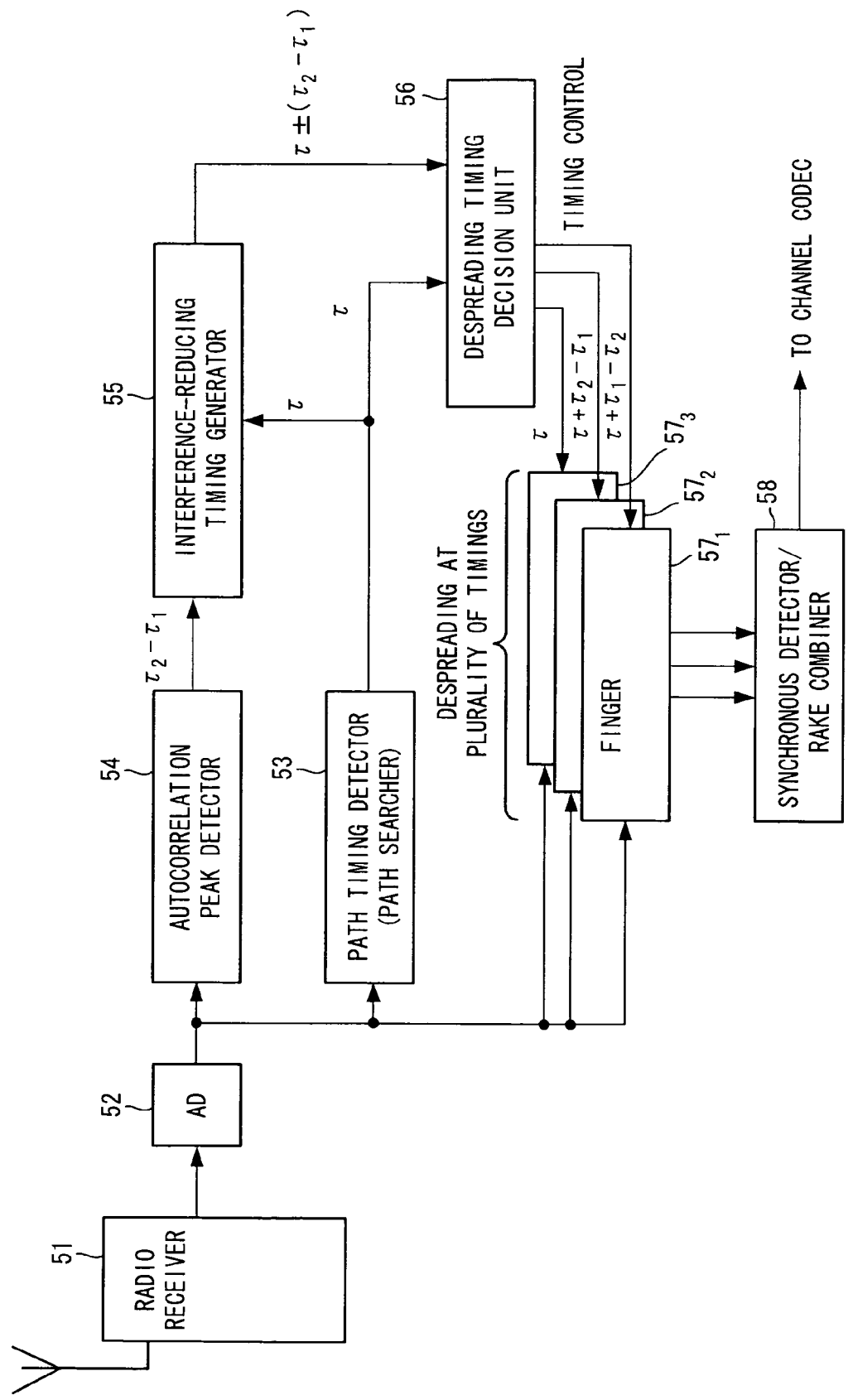
FIG. 7 is a block diagram illustrating the principal components of a CDMA receiver according to a first embodiment of the present invention.

FIG. 7 is a block diagram illustrating the principal components of a CDMA receiver according to a first embodiment of the present invention. It is assumed that the delay profile is the same as illustrated in FIG. 5.

A radio receiver 51 converts a received high-frequency signal to a baseband signal by a frequency conversion, applies quadrature demodulation and inputs the resultant signal to an AD converter 52. The AD converter 52 converts the input signal to digital data and outputs the same. A path timing detector (path searcher) 53 having the construction of a matched filter calculates the correlation between a received spread-spectrum signal and the spreading codes (already known) $p_1, p_2, \ldots, p_N$ used by the communicating base station BTS1 and searches for a path (path timing $\tau$) from the communicating base station BTS.

In parallel with the path search, an autocorrelation peak detector 54 calculates the autocorrelation of the received spread-spectrum signal and detects a peak timing $\Delta\tau$ $(=\tau_2-\tau_1)$. Using the path timing $\tau$ and the peak timing $(=\tau_2-\tau_1)$, an interference-reducing timing generator 55 generates interference-reducing timings $\tau\pm(\tau_2-\tau_1)$ for eliminating interference components that arrive from the adjacent base station. A despreading timing decision unit 56 decides a plurality of despreading timings $\tau$, $\tau\pm(\tau_2-\tau_1)$, at which despreading will be performed, from the multipath timing $\tau$ and interference-reducing timings $\tau\pm(\tau_2-\tau_1)$. Fingers $57_1$ to $57_3$ multiply the receive spread-spectrum signal by the spreading codes $p_1, p_2, \ldots, p_N$ at the timings $\tau$, $\tau\pm(\tau_2-\tau_1)$, respectively, thereby despreading the spread-spectrum signal, and a synchronous detector/RAKE combiner 58 performs weighting so as to reduce interference and carries out RAKE-combining. The resultant signal is output to a channel codec, not shown.

(E) Second Embodiment

In the first embodiment, the path timing difference $\Delta\tau$ $(=t_2-t_1)$ is calculated from the peak timing of the autocorrelation of a spread-spectrum signal received by a receiver. However, if the delay profile from an adjacent cell can be obtained, then the path timing difference $\Delta\tau$ $(=t_2-t_1)$ can be calculated from the profile. More specifically, if the delay profile from the adjacent cell is as indicated by the solid lines $\beta_1$, $\beta_2$ in (A) of FIG. 8, then the timing difference between the paths $\beta_1$ and $\beta_2$ will be $\Delta\tau$ $(=\tau_2-\tau_1)$. It should be noted that if the delay profile is as illustrated at (B) in FIG. 8, then the timing difference between the paths $\beta_1$ and $\beta_2$ of first and second largest power will be $\Delta\tau$ $(=t_2-t_1)$.

Figure 9:
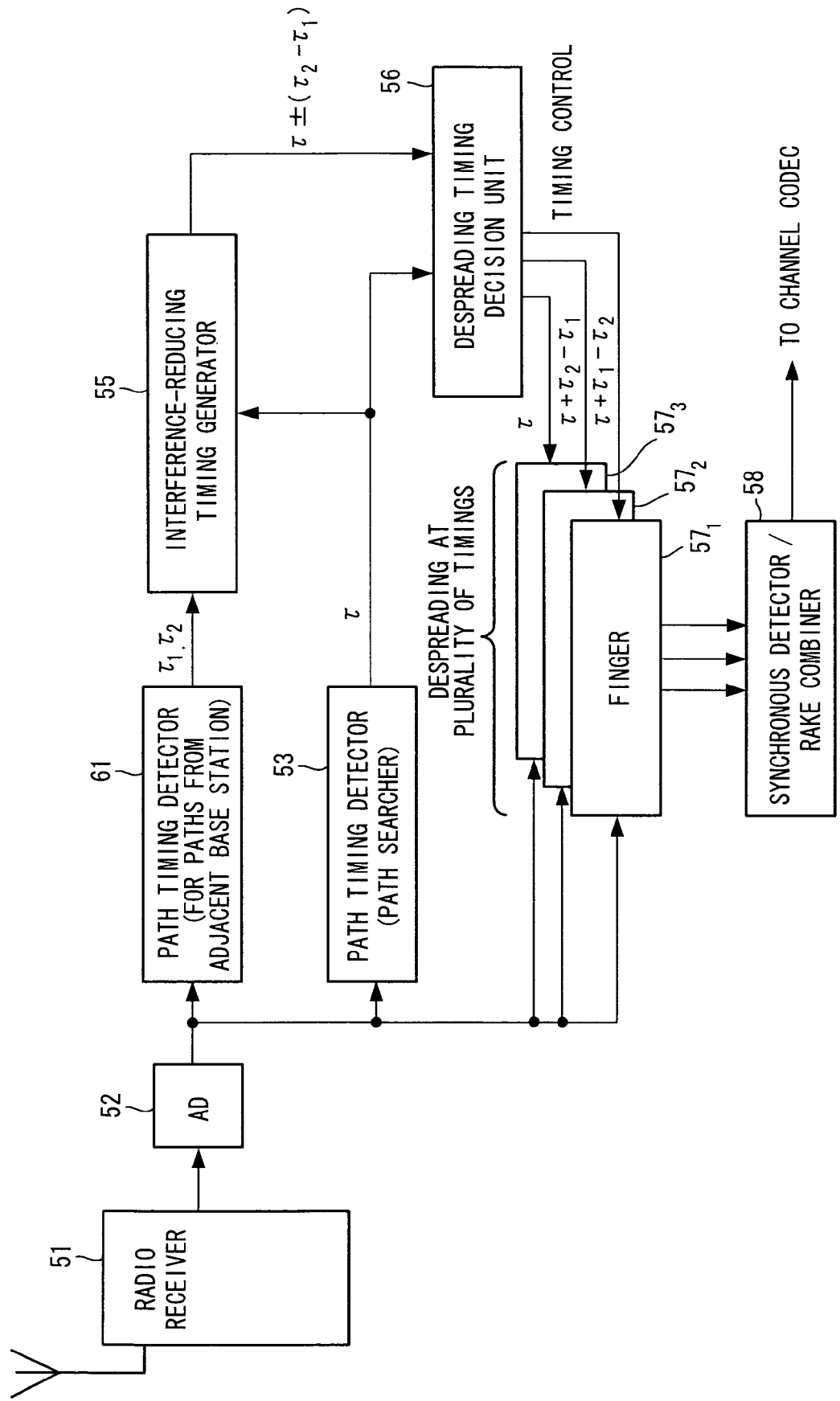
FIG. 9 is a block diagram illustrating the principal components of a CDMA receiver according to a second embodiment of the present invention.

FIG. 9 is a block diagram illustrating the principal components of a CDMA receiver according to a second embodiment of the present invention. It is assumed that the delay profile is that indicated at (A) of FIG. 8.

The radio receiver 51 converts a received high-frequency signal to a baseband signal by a frequency conversion, applies quadrature demodulation and inputs the resultant signal to the AD converter 52. The AD converter 52 converts the input signal to digital data and outputs the same. The path timing detector (path searcher) 53 having the construction of a matched filter calculates the correlation between the received spread-spectrum signal and the spreading codes $p_1, p_2, \ldots, p_N$ used by the communicating base station BTS1 and searches for path timing τ [see (A) of FIG. 8] from the communicating base station BTS1. A path timing detector (path searcher) 61, which is for detecting path timing of an adjacent cell, calculates the correlation between the received spread-spectrum signal and the spreading codes $p_1, p_2, \ldots, p_N$ of the adjacent base station and obtains the delay profile (path timings $\tau_1, \tau_2$) from the base station BTS2.

Using the path timings $\tau_1, \tau_2$, the interference-reducing timing generator 55 generates interference-reducing timings $\tau \pm (\tau_2 - \tau_1)$ for eliminating interference components that arrive from the adjacent base station. The despreading timing decision unit 56 decides a plurality of despreading timings τ, $\tau \pm (\tau_2 - \tau_1)$, at which despreading will be performed, from the path timing τ and interference-reducing timings $\tau \pm (\tau_2 - \tau_1)$. The fingers $57_1$ to $57_3$ multiply the receive spread-spectrum signal by the spreading codes $p_1, p_2, \ldots, p_N$ at the timings τ, $\tau \pm (\tau_2 - \tau_1)$, respectively, thereby despreading the spread-spectrum signal, and the synchronous detector/RAKE combiner 58 performs weighting so as to reduce interference and carries out RAKE-combining. The resultant signal is output to a channel codec, not shown.

(F) Third Embodiment

Figure 10:
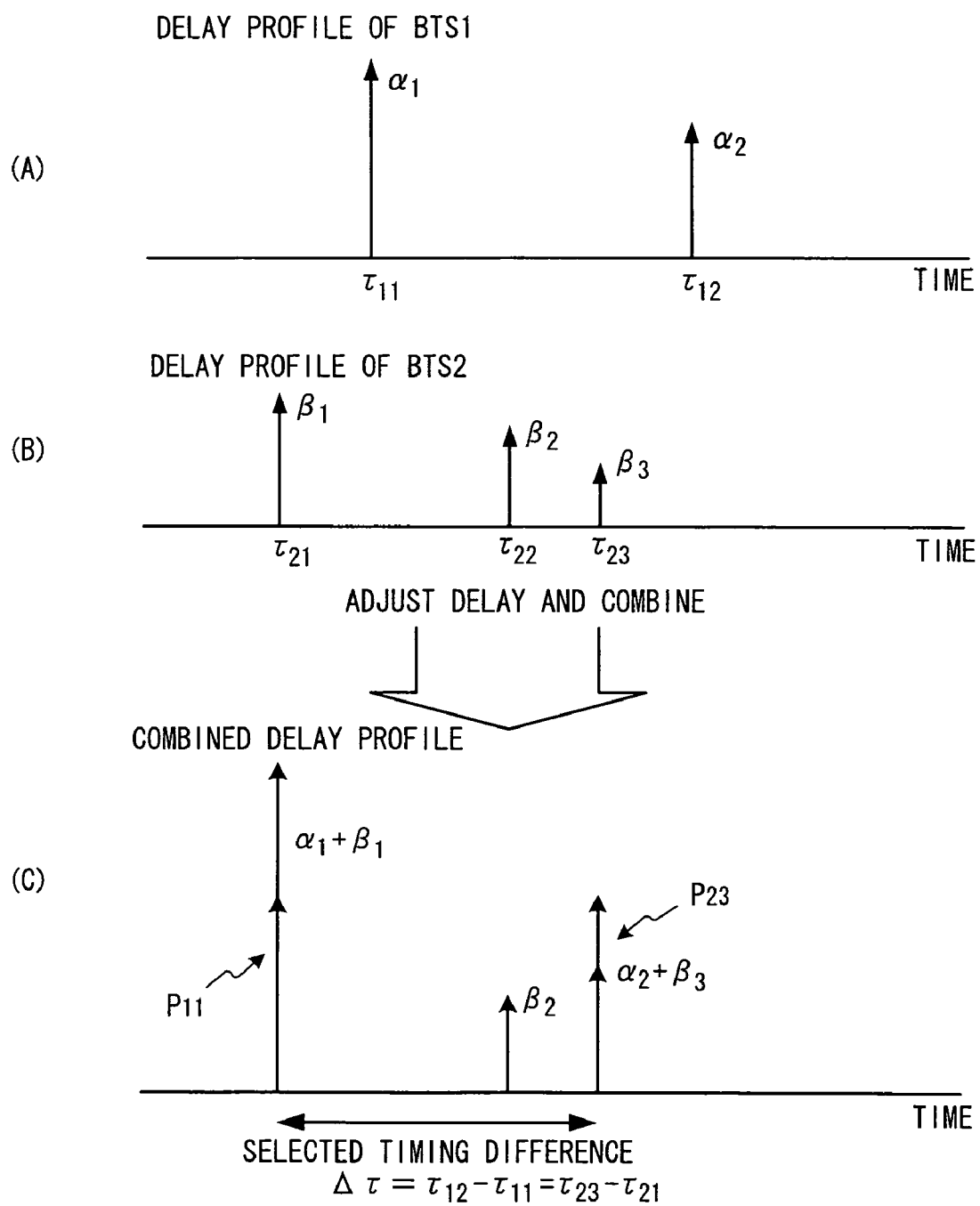
FIG. 10 illustrates examples of delay profiles in a case where there are two multiple paths $\alpha_1, \alpha_2$ from a base station BTS1 with which communication is currently in progress and three multiple paths $\beta_1, \beta_2, \beta_3$ from an adjacent base station BTS2.

The first and second embodiments relate to a case where there is one path from the communicating base station BTS1, though there are also cases where there are a plurality of paths. As shown at (A) and (B) in FIG. 10, assume a case where there are two paths $\alpha_1, \alpha_2$ from the communicating base station BTS1 and three paths $\beta_1, \beta_2, \beta_3$ from the adjacent base station BTS2. The path timing difference Δτ in such case is decided as follows: Delay profiles of all observable base stations BTS are found, the delay profiles are shifted, superimposed and combined appropriately, two paths for which the total of the two combined powers is maximum is obtained and the timing difference between these two paths is adopted as the timing difference Δτ. In the example of FIG. 10, for instance, when path $\alpha_1$ in the delay profile of the communicating base station BTS1 and path $\beta_1$ of the delay profile of the adjacent base station BTS2 are superimposed, at indicated at (C) in FIG. 10, path $\alpha_2$ and path $\beta_3$ also overlap and the sum of the combined power P11 and combined power P23 will be the largest among all overlaps. Accordingly, despreading timing is decided using the timing difference ($=\tau_{12}-\tau_{11}=\tau_{23}-\tau_{21}$) indicated at (C) as the path timing difference Δτ and using the timing $\tau_{11}$ of path $\alpha_1$ as τ. When the path timing difference Δτ and τ are thus decided, the interference components from path $\beta_1$ and path $\alpha_1$, etc., contained in the RAKE-combined signal of paths $\alpha_1, \alpha_2$ can be diminished effectively.

Figure 11:
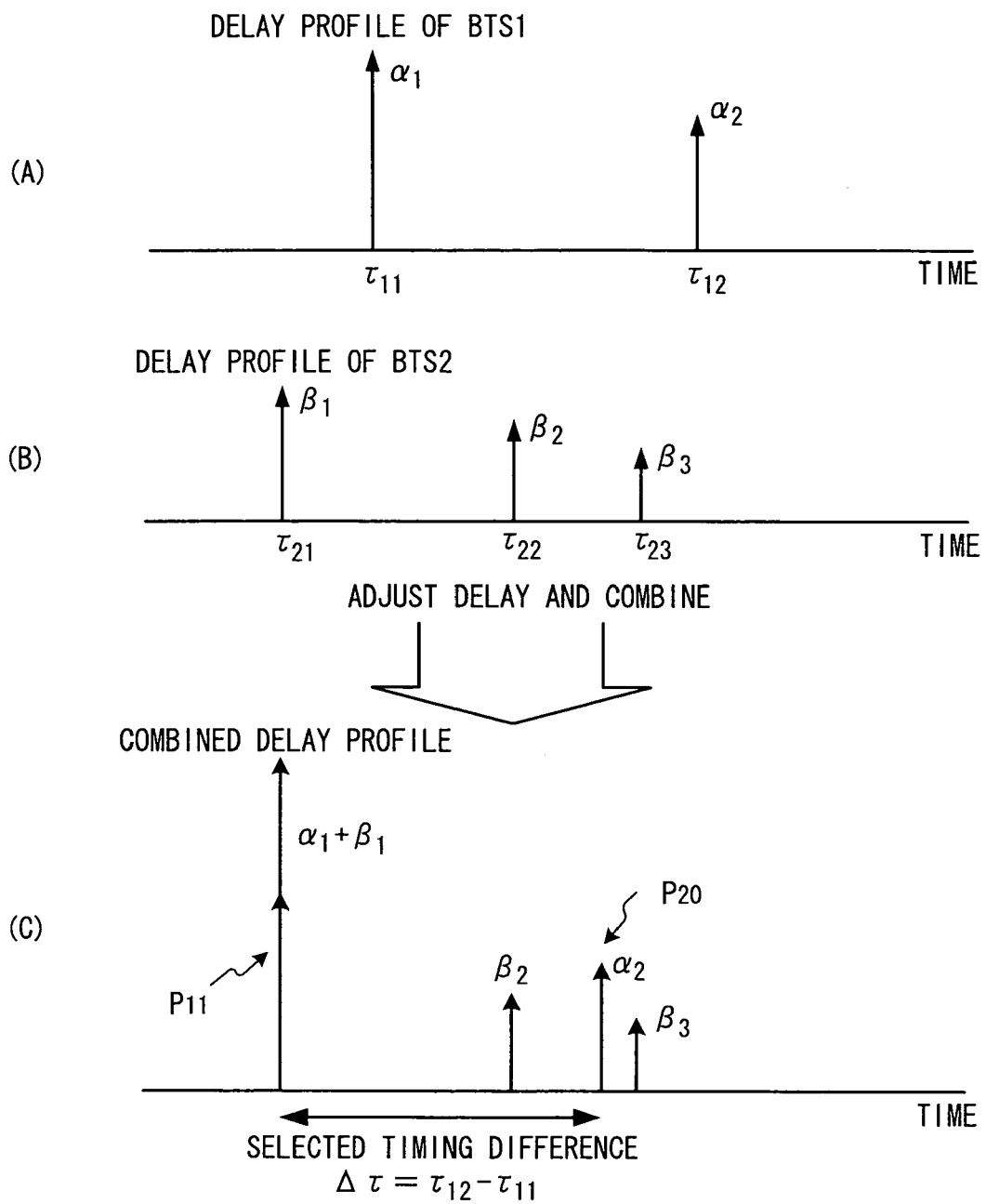
FIG. 11 illustrates other examples of delay profiles in a case where there are two multiple paths $\alpha_1, \alpha_2$ from a base station BTS1 with which communication is currently in progress and three multiple paths $\beta_1, \beta_2, \beta_3$ from an adjacent base station BTS2.
Figure 28:
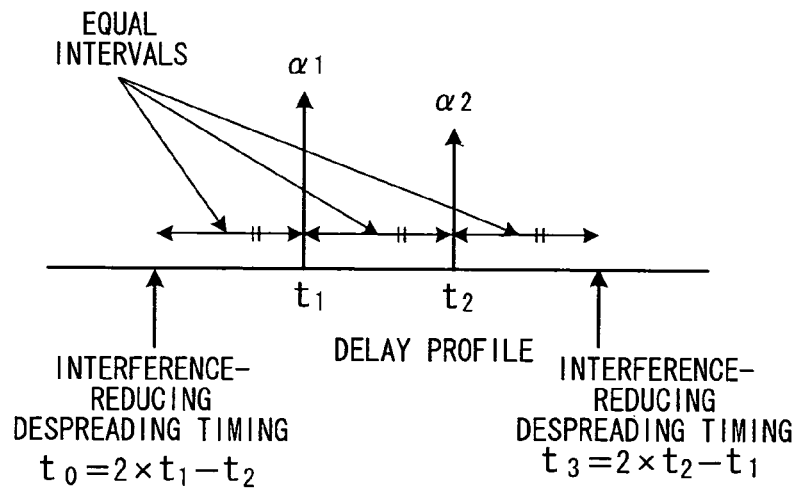
FIG. 28 is a diagram useful in describing despreading timing for eliminating interference components.
Figure 29:
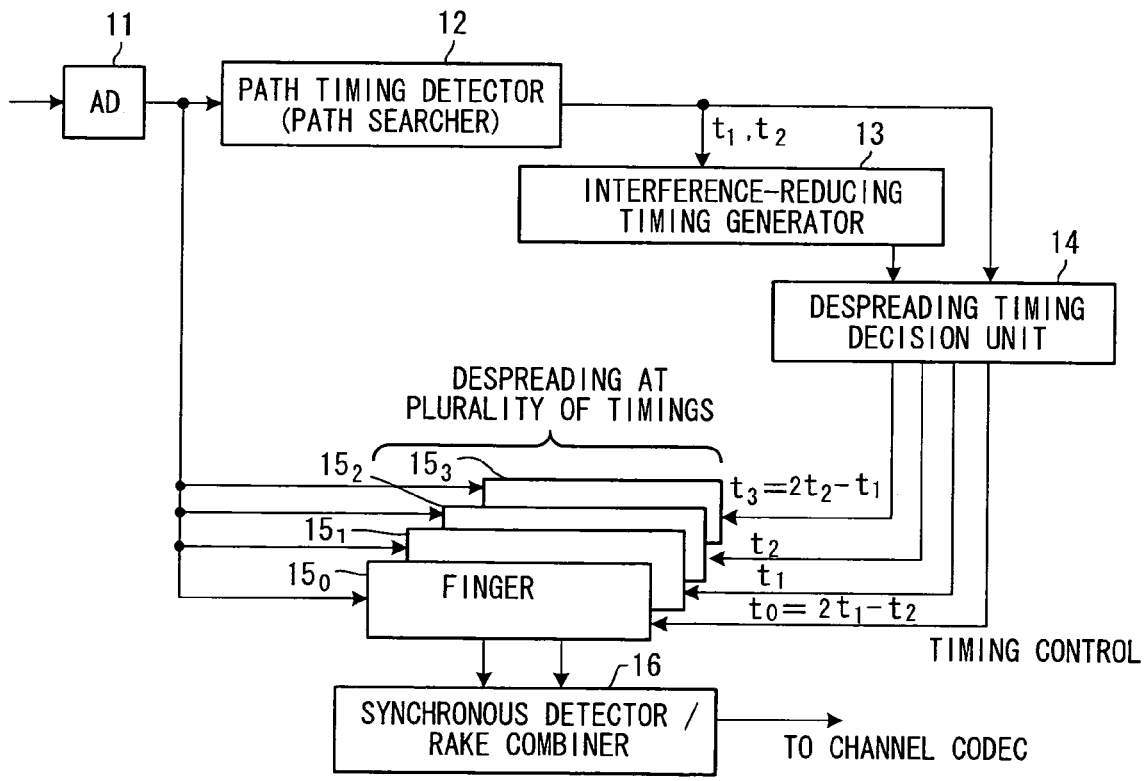
FIG. 29 is a block diagram of a RAKE receiver for eliminating an interference component contained in path 1 of channel characteristic $\alpha_1$, simultaneously eliminating an interference component contained in path 2 and performing RAKE-combining.
Figure 30:
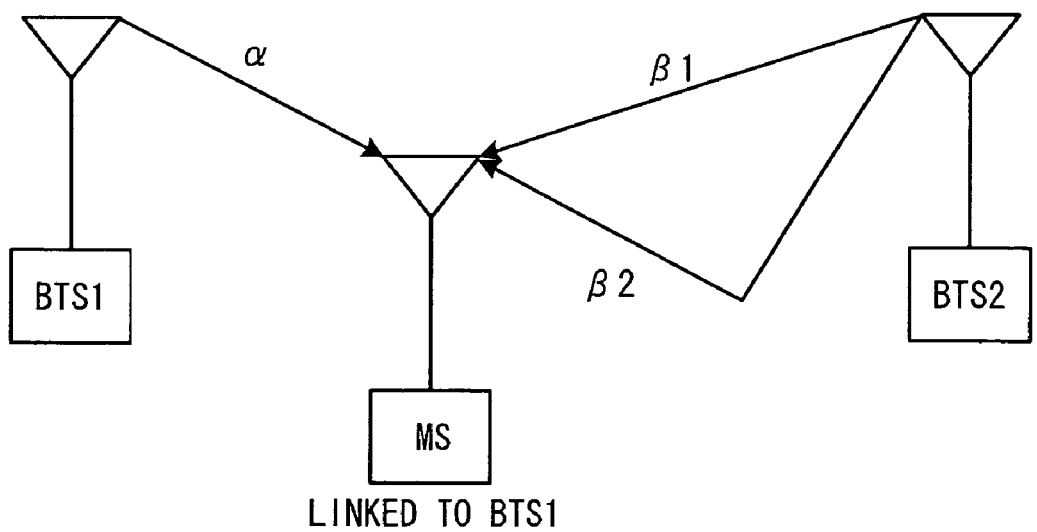
FIG. 30 is a diagram useful in describing paths from a base station BTS1 with which communication is currently in progress and an adjacent base station BTS2 to a mobile station MS.
Figure 31:
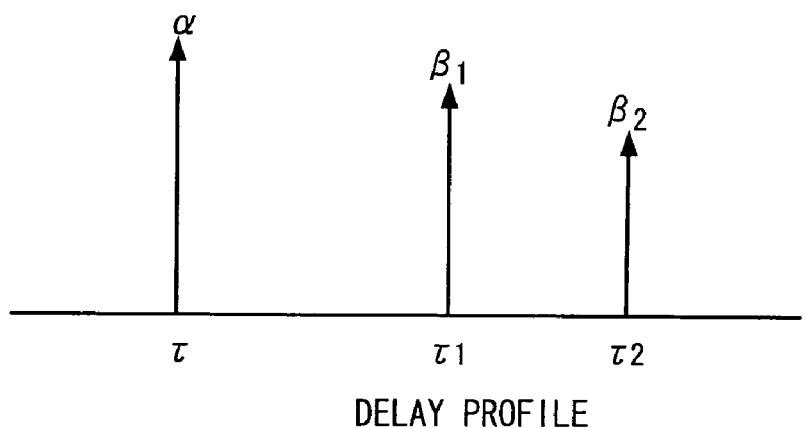
FIG. 31 illustrates a delay profile.

FIG. 10 represents a case where path $\alpha_2$ and path $\beta_3$ also overlap when the path $\alpha_1$ of the delay profile and the path $\beta_1$ of the delay profile are superimposed. However, there are also cases where the latter overlap does not occur, as illustrated in FIGS. 11 and 12. In the case of FIG. 11, when path $\alpha_1$ in the delay profile of the communicating base station BTS1 and path $\beta_1$ of the delay profile of the adjacent base station BTS2 are superimposed, the sum of the combined power P11 and power P20 of path $\alpha_2$ will be the largest among all overlaps. Accordingly, despreading timing is decided using the timing difference ($=\tau_{12}-\tau_{11}$) indicated at (C) as the path timing difference Δτ and using the timing $\tau_{11}$ of path $\alpha_1$ as τ. When the path timing difference Δτ and τ are thus decided, a situation the same as that of the prior-art example described above with reference to FIGS. 28 and 29 is obtained and the interference components contained in the RAKE-combined signal can be diminished. In this case, the interference components from the base station BTS2 are small and therefore are not diminished.

In the case of FIG. 12, when path $\alpha_1$ in the delay profile of the communicating base station BTS1 and path $\beta_1$ of the delay profile of the adjacent base station BTS2 are superimposed, as illustrated at (C) in FIG. 12, the sum of the combined power P11 and power P20 of path $\beta_2$ will be the largest among all overlaps. Accordingly, despreading timing is decided using the timing difference indicated at (C) as the path timing difference Δτ and using the timing $\tau_{11}$ of path $\alpha_1$ as τ. When the path timing difference Δτ and τ are thus decided, a situation the same as that described in the first and second embodiments is obtained and the interference components from the base station BTS2 contained in the RAKE-combined signal can be diminished. In this case, the interference components from the base station BTS2 are small and therefore are not diminished.

Figure 13:
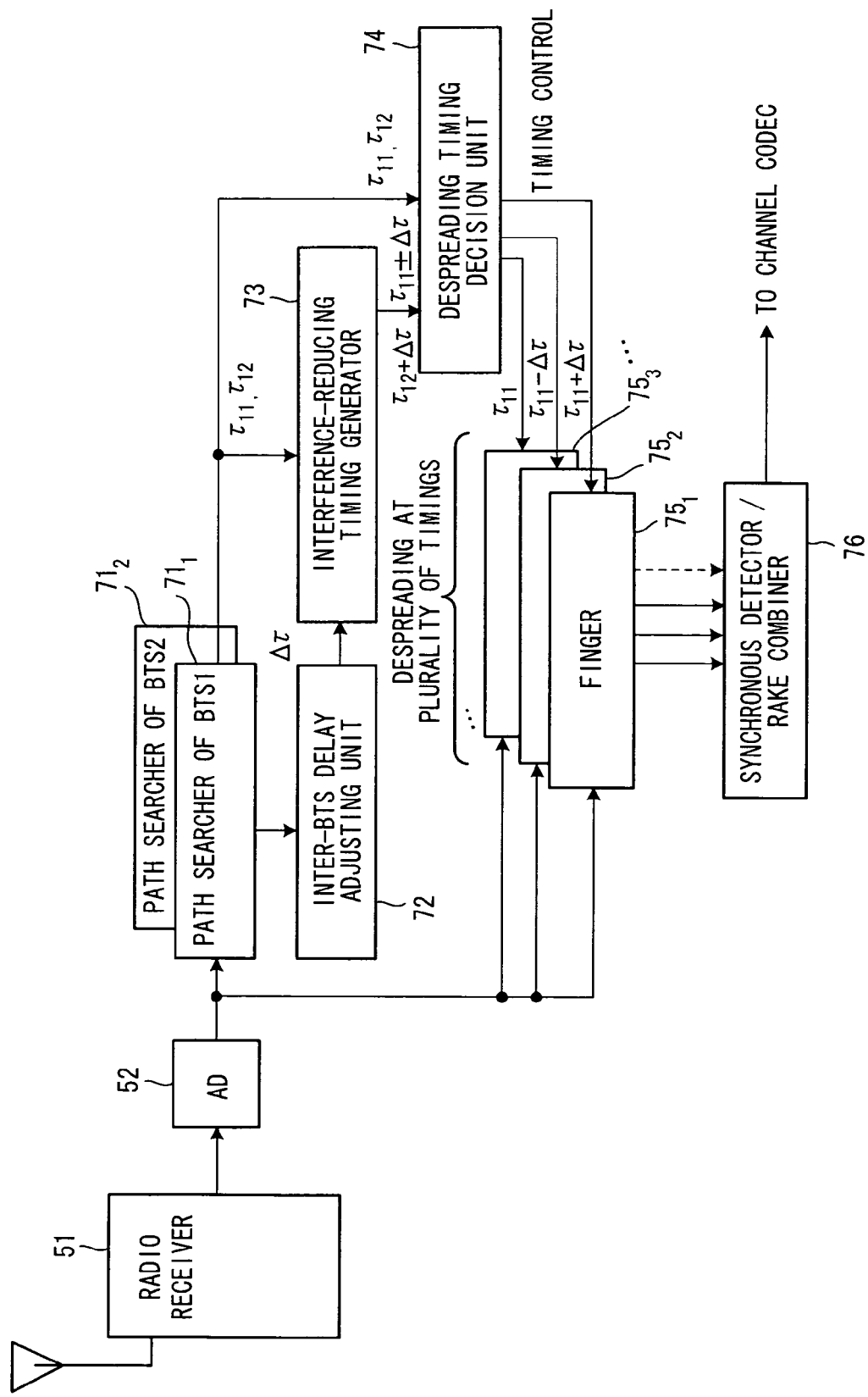
FIG. 13 is a block diagram illustrating the principal components of a CDMA receiver according to a third embodiment of the present invention.

FIG. 13 is a block diagram illustrating the principal components of a CDMA receiver according to a third embodiment of the present invention. Here there is one adjacent base station.

The radio receiver 51 converts a received high-frequency signal to a baseband signal by a frequency conversion, applies quadrature demodulation and inputs the resultant signal to the AD converter 52. The AD converter 52 converts the input signal to digital data and outputs the same. A first path searcher $71_1$ having the construction of a matched filter calculates the correlation between the received spread-spectrum signal and the spreading codes $p_1, p_2, \ldots p_N$ used by the communicating base station BTS1 and searches for path timings $\tau_{11}, \tau_{12}$ (see FIGS. 10 to 12) from the communicating base station BTS1. A path searcher $71_2$ of the adjacent cell calculates the correlation between the received spread-spectrum signal and the spreading codes $q_1, q_2, \ldots, q_N$ (already known) of the adjacent base station and obtains the delay profile (path timings $\tau_{21}, \tau_{22}, \tau_{23}$) from the base station BTS2.

An inter-BTS delay adjusting unit 72 shifts, superimposes and combines the delay profiles appropriately and finds the path timing difference Δτ (see FIGS. 10 to 12) for which the sum of two combined powers at two timings in the combined delay profile is largest. Using the path timings $\tau_{11}, \tau_{12}$ of the communicating base station BTS1 and the path timing difference Δτ, an interference-reducing timing generator 73 generates interference-reducing timings $\tau_{11} \pm \Delta\tau, \tau_{12} \pm \Delta\tau$. It should be noted that $\tau_{11} \pm \Delta\tau$ is interference-reducing timing for eliminating interference from the adjacent base station, and $\tau_{12} + \Delta\tau, \tau_{11} - \Delta\tau$ are interference-reducing timings for eliminating interference from the base station with which communication is currently in progress.

A despreading timing decision unit 74 decides and outputs a plurality of despreading timings from the path timings $\tau_{11}, \tau_{12}$ and interference-reducing timings $\tau_{11} \pm \Delta\tau, \tau_{12} \pm \Delta\tau$. Further, in the case of (C) in FIG. 10, it is necessary to reduce interference from the adjacent base station and interference from the communicating base station and therefore the despreading timing decision unit 74 outputs $\tau_{11}, \tau_{12}, \tau_{11} \pm \Delta\tau, \tau_{12} + \Delta\tau$ as the despreading timings. In the case of (C) in FIG. 11, it will suffice to reduce only interference from the communicating base station and therefore the despreading timing decision unit 74 outputs $\tau_{11}, \tau_{11} - \Delta\tau, \tau_{11} + \Delta\tau$ as the despreading timings.

Fingers $75_1, 75_2, 75_3, \ldots$ multiply the receive spread-spectrum signal by the spreading codes $p_1, p_2, \ldots, p_N$ at the timings $\tau_{11}, \tau_{11} - \Delta\tau, \tau_{11} + \Delta\tau, \ldots$, respectively, which have been specified by the despreading timing decision unit 74, thereby despreading the spread-spectrum signal, and a synchronous detector/RAKE combiner 76 synchronously detects the results of despreading and then performs weighting so as to reduce interference and carries out RAKE-combining. The resultant signal is output to a channel codec, not shown.

(G) Fourth Embodiment

Figure 14:
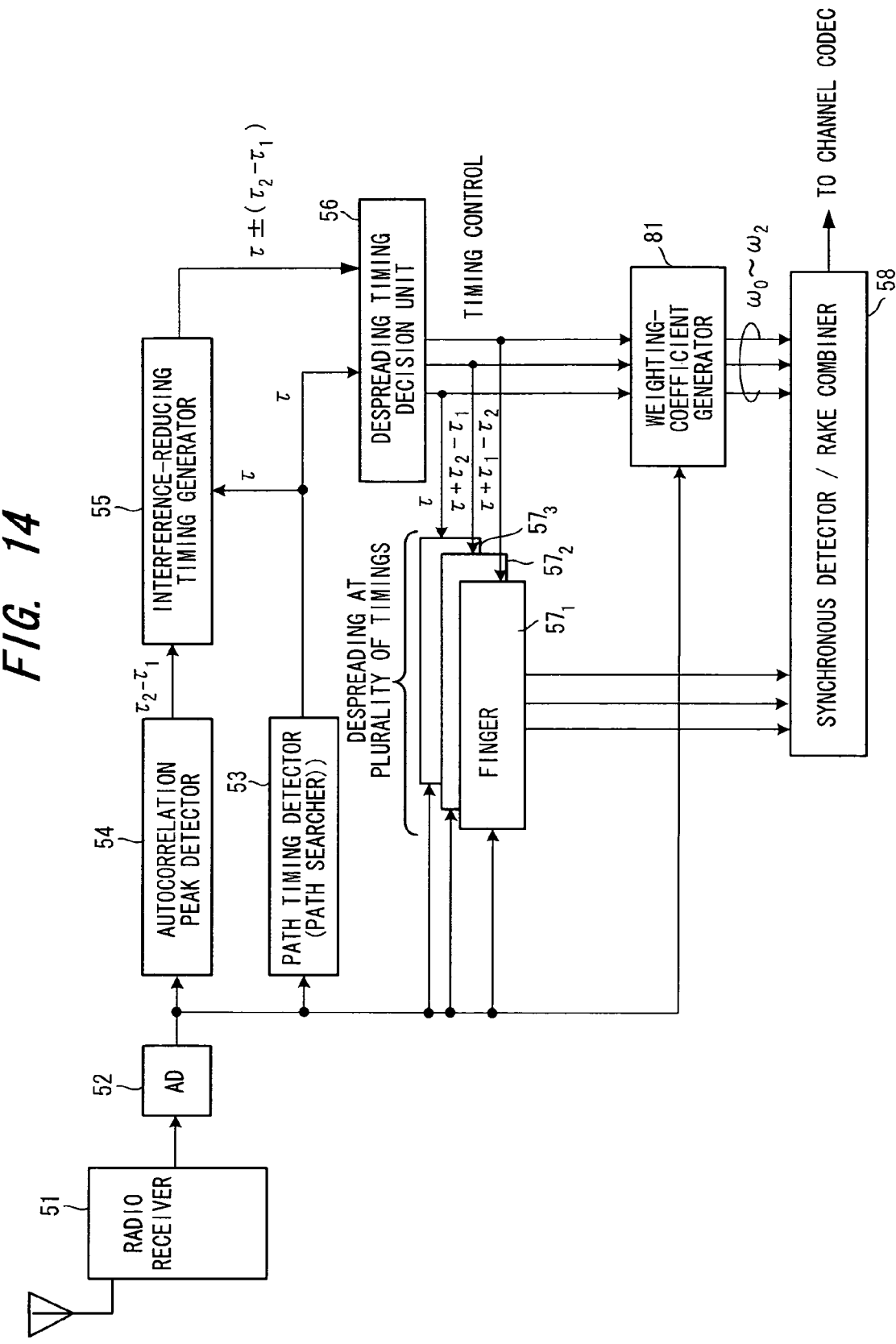
FIG. 14 is a block diagram showing the principal components of a CDMA receiver according to a fourth embodiment having a weighting-coefficient generator.

FIG. 14 is a block diagram illustrating the principal components of a CDMA receiver according to a fourth embodiment having a weighting-coefficient generator 81. This embodiment is obtained by providing the arrangement of the CDMA receiver (see FIG. 7) of the first embodiment with the weighting-coefficient generator 81. Using the received spread-spectrum signal and the despreading timing, the weighting-coefficient generator 81 calculates weighting coefficients $w_0$ to $w_2$, which are for multiplying the results of despreading and inputs these to the synchronous detector/RAKE combiner 58. In order to demodulate the desired signal from the base station BTS1 with which communication is currently in progress, the finger $57_3$ performs despreading at the timing $\tau$. In order to reduce interference from the adjacent base station BTS2, the fingers $57_1$, $57_2$ perform despreading at the timings $\tau_0 = \tau - \tau_2 + \tau_1$, $\tau_3 = \tau + \tau_2 - \tau_1$. The results of despreading from these fingers are input to the synchronous detector/RAKE combiner 58. The latter weights the results of despreading by the weighting coefficients $w_0$ to $w_2$, combines the weighted signals and outputs the resultant signal.

Figure 15:
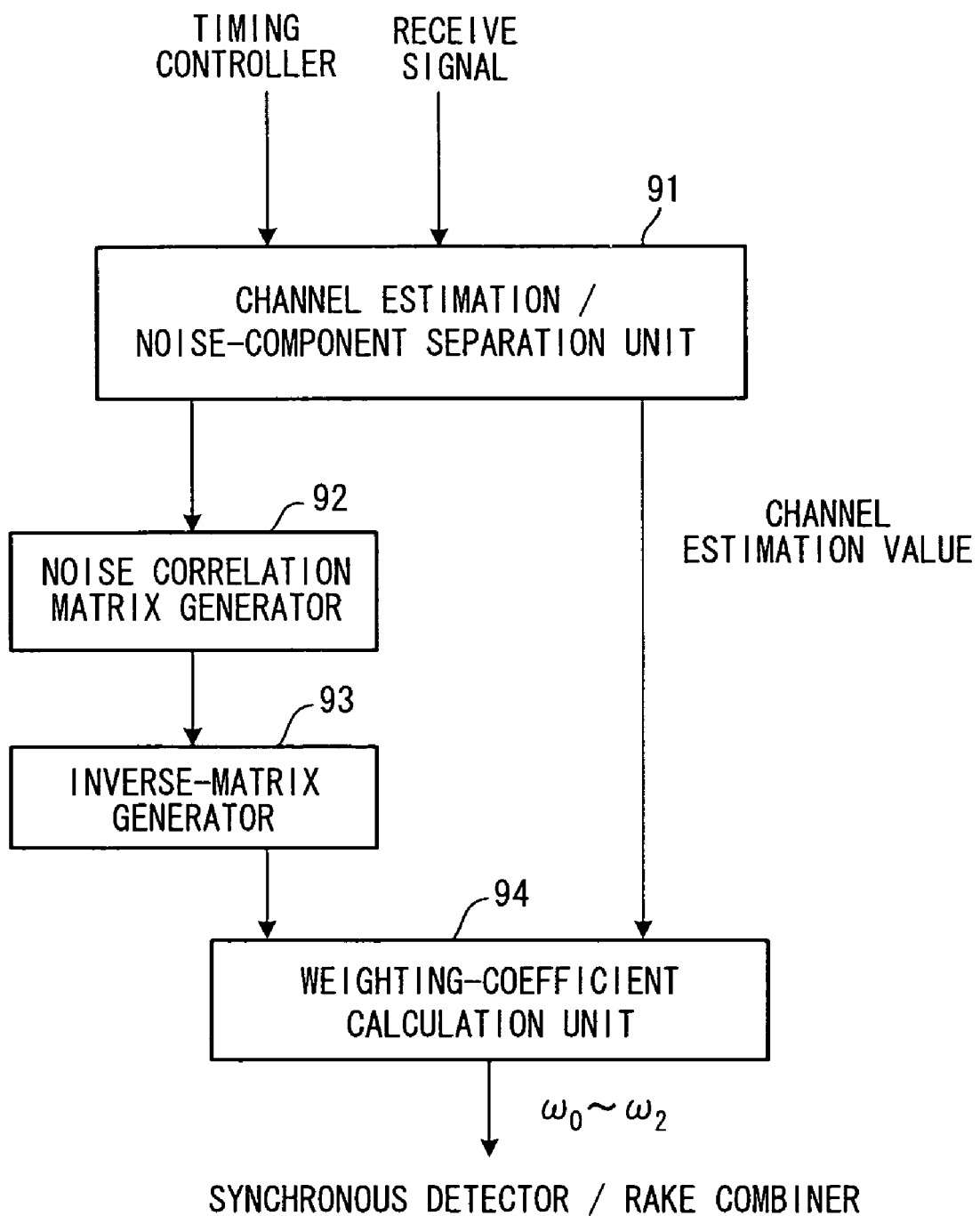
FIG. 15 is a block diagram illustrating the weighting-coefficient generator.

FIG. 15 is a block diagram illustrating the weighting-coefficient generator 81. A channel estimation/noise-component separation unit 91 estimates the channel of each path using the receive signal (spread-spectrum signal) and despreading timings $\tau$, $\tau \pm (\tau_2 - \tau_1)$ and separates noise components. A noise correlation matrix generator 92 generates a noise correlation matrix from noise components, an inverse-matrix generator 93 generates a matrix that is the inverse of the noise correlation matrix, and a weighting-coefficient calculation unit 94 uses the matrix that is the inverse of the noise correlation matrix and the channel estimation values.

Figure 16:
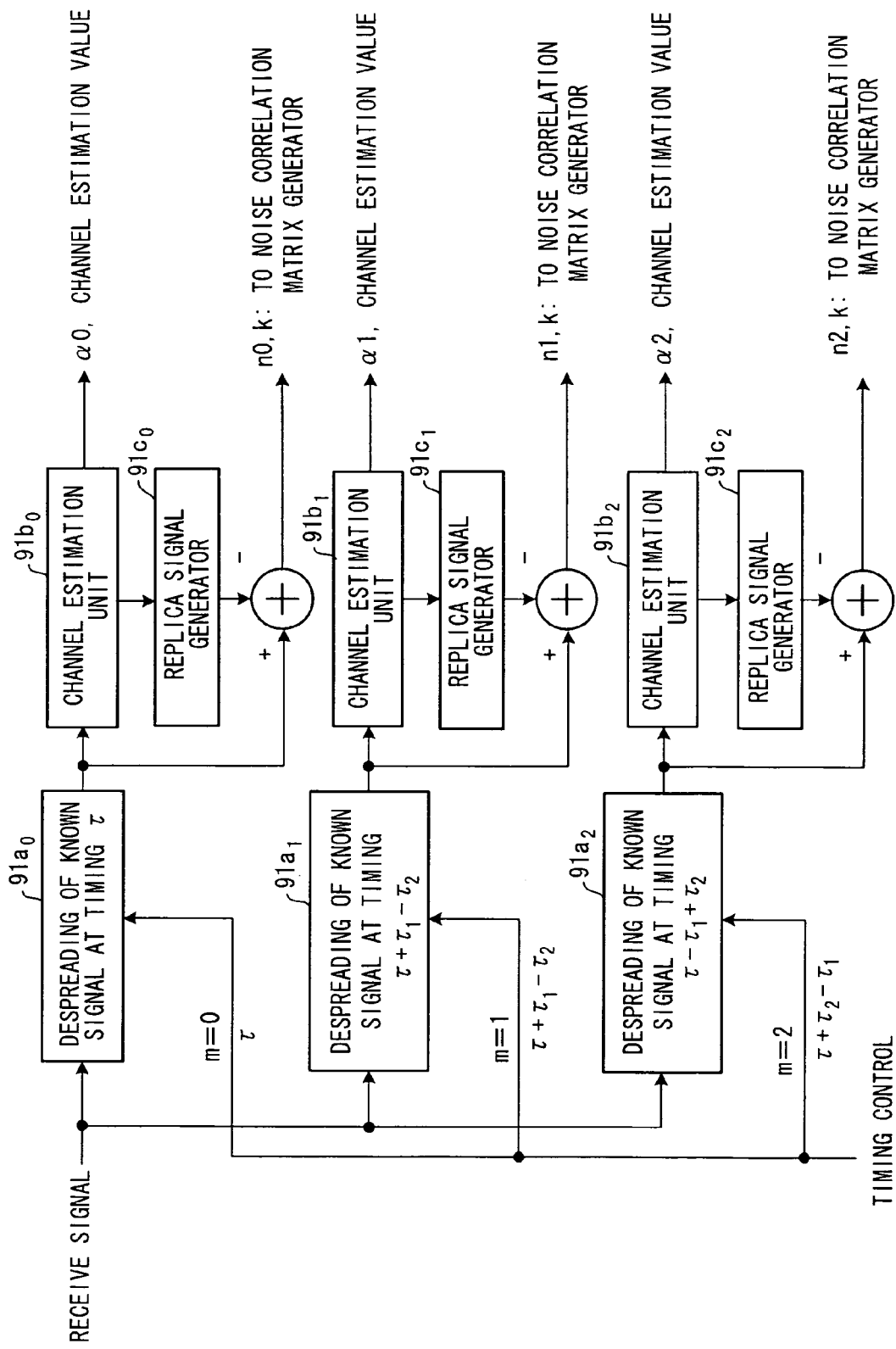
FIG. 16 is a block diagram illustrating a channel estimation/noise-component separation unit.

FIG. 16 is a block diagram illustrating the channel estimation/noise-component separation unit 91. Since a known signal (pilot signal) has been multiplexed onto the receive signal, the channel estimation/noise-component separation unit 91 obtains the channel estimation values and separates the noise components using the pilot signal. Despreaders $91a_0$ to $91a_2$ perform despreading by multiplying the receive signal by the spreading code of the pilot signal at despreading timings m (m=0, 1, 2), respectively, obtained by the despreading timing decision unit 56, and output despread signals that are the result of despreading the receive signal. It should be noted that m=0, m=1, m=2 correspond to the despreading timings $\tau$, $\tau + \tau_1 - \tau_2$ and $\tau - \tau_1 + \tau_2$, respectively.

Channel estimation units $91b_0$ to $91b_2$ each perform averaging over N symbols and calculate a channel estimation value $\alpha_m$ according to the following equation:

$$\alpha_m = \frac{1}{N} \sum_{k=0}^{N-1} a_k^* \cdot v_{m,k} \tag{12}$$

where $v_{m,k}$ represents a kth despread signal at timing m (=0, 1, 2) and $a_k$ represents a kth known pilot signal. If pilot signal $a_k$ is a QPSK signal of size 1, then it will be any one of the following:

$$a_k = \frac{1+j}{\sqrt{2}}, \frac{1-j}{\sqrt{2}}, \frac{-1+j}{\sqrt{2}} \text{ or } \frac{-1-j}{\sqrt{2}}$$

For example, $$a_k = \frac{1+j}{\sqrt{2}}$$

Replica signal generators $91c_0$ to $91c_2$ multiply the known pilot signal $a_k$ by the channel estimation value $\alpha_m$ to thereby generate replica signals. Arithmetic units $91d_0$ to $91d_2$ obtain noise components $n_{m,k}$ by subtracting the replica signal $a_k \cdot \alpha_m$ from the despread signal $v_{m,k}$. That is, the arithmetic units $91d_0$ to $91d_2$ calculate the noise components $n_{m,k}$ according to the following equation:

$$n_{m,k} = v_{m,k} - a_k \cdot \alpha_m \tag{13}$$

Figures 17, 18:
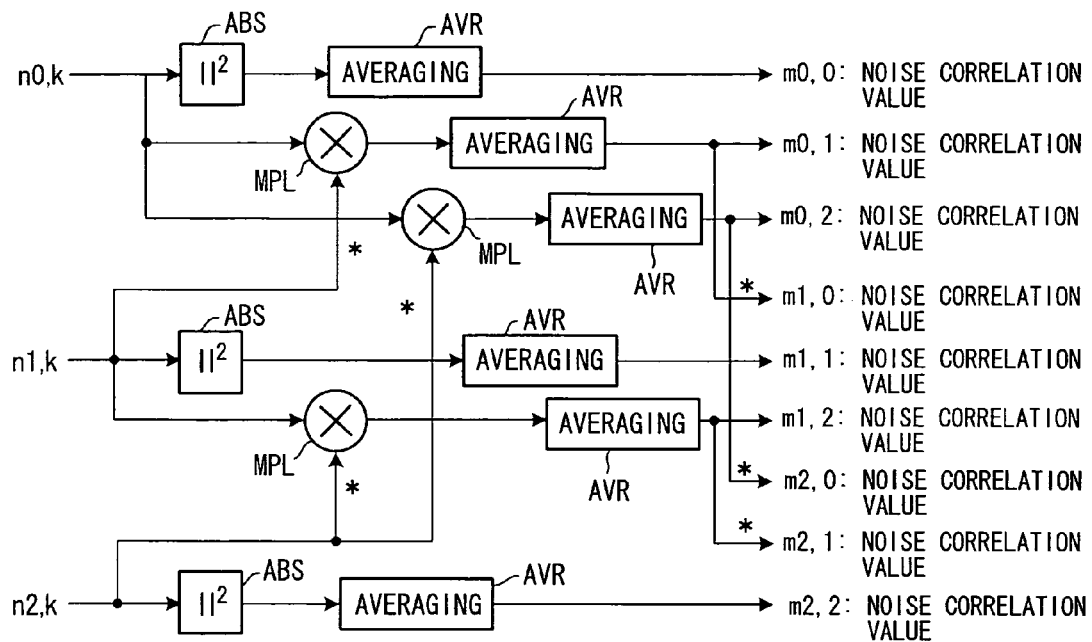
FIG. 17 is a block diagram illustrating a noise correlation matrix generator.
FIG. 18 is a diagram useful in describing an inverse-matrix generator/weighting-coefficient calculation unit.

FIG. 17 is a block diagram illustrating the noise correlation matrix generator 92. Noise correlation is auto- and cross-correlation of noise components obtained by Equation (13). A noise correlation value $m_{i,j}$ can be calculated using the following equation:

$$m_{i,j} = \sum_{k=0}^{N-1} n_{i,k} \cdot n_{j,k}^* \tag{14}$$

In FIG. 17, ABS represents an absolute-value calculation unit, MPL a multiplier, AVR an averaging unit, and * a complex conjugate.

FIG. 18 illustrates an inverse-matrix generator/weighting-coefficient calculation unit. The latter obtains a conjugate transposed matrix of a channel estimation vector, which has the three channel estimation values $\alpha_0$, $\alpha_1$, $\alpha_2$ as its elements, and a matrix that is the inverse of the noise correlation matrix M, adopts $w_0$, $w_1$, $w_2$ as weighting coefficients of the vector obtained by vector multiplication between the matrices, and inputs these weighting coefficients to the synchronous detector/RAKE combiner 58. The latter weights the results of spreading by these weighting coefficients $w_0$, $w_1$, $w_2$, combines the results and outputs the result of the combining operation. A signal $x_k$ obtained following the RAKE combining operation is given by the following equation:

$$x_k = \sum_{m=0}^{2} w_m \cdot v_{m,k} \tag{15}$$

Figure 19:
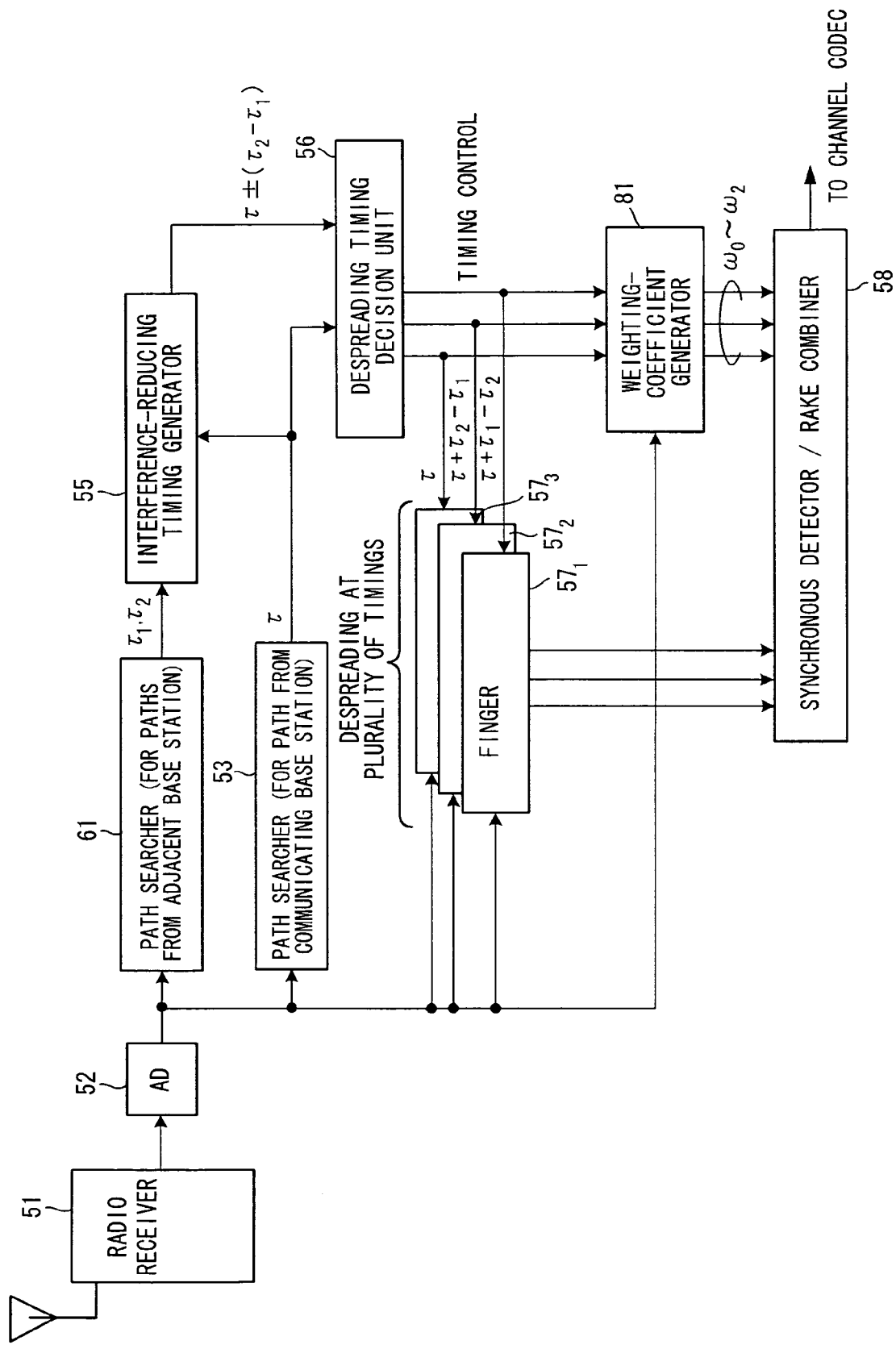
FIG. 19 is another block diagram illustrating the principal components of a CDMA receiver having a weighting-coefficient generator.

FIG. 19 is another block diagram illustrating the principal components of a CDMA receiver having a weighting-coefficient generator. This arrangement is obtained by providing the CDMA receiver of the second embodiment (see FIG. 9) with the weighting-coefficient generator 81.

Figure 20:
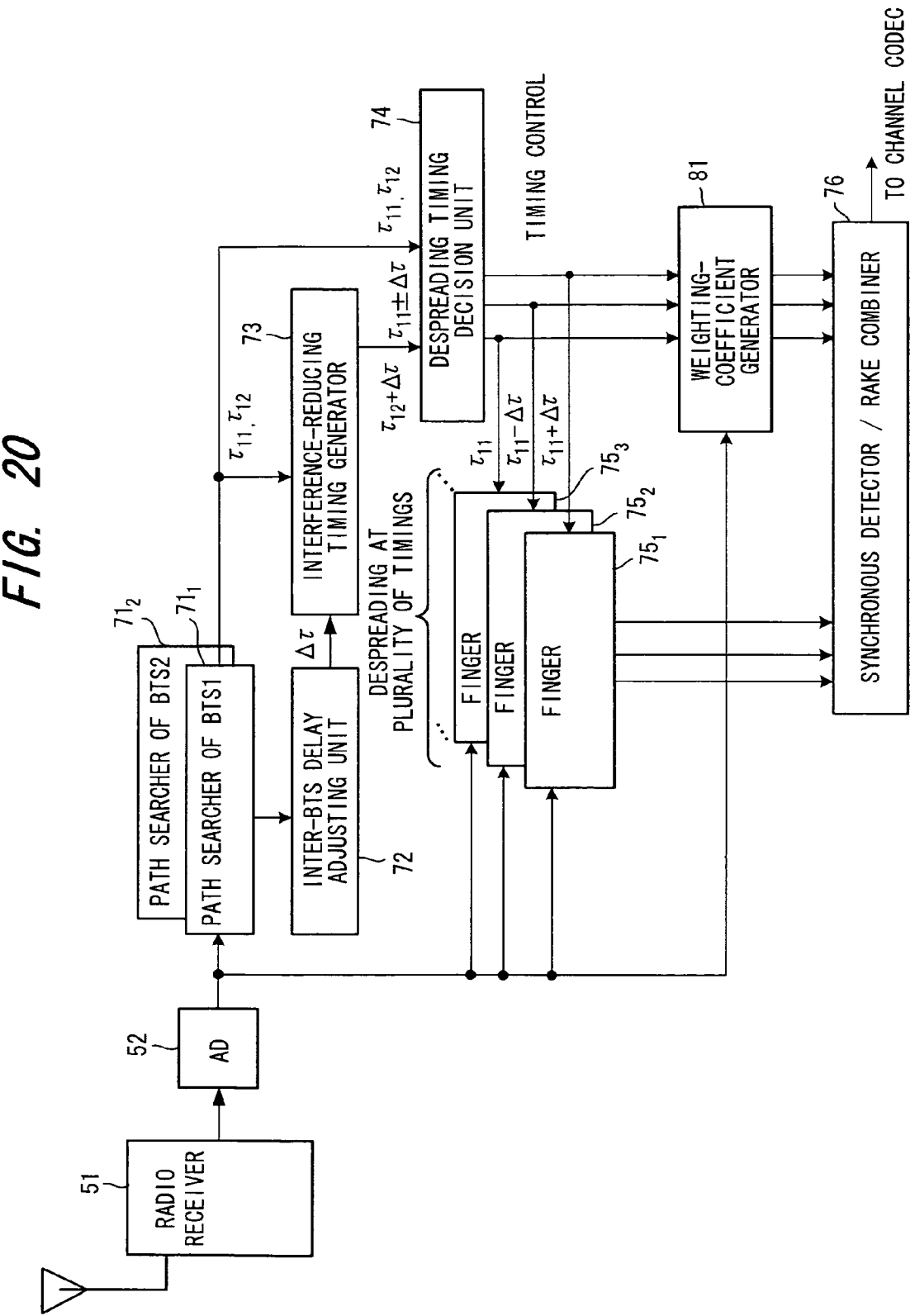
FIG. 20 is a further block diagram illustrating the principal components of a CDMA receiver having a weighting-coefficient generator.

FIG. 20 is a further block diagram illustrating the principal components of a CDMA receiver having a weighting-coefficient generator. This arrangement is obtained by providing the CDMA receiver of the third embodiment (see FIG. 13) with the weighting-coefficient generator 81.

(H) Fifth Embodiment

Figure 21:
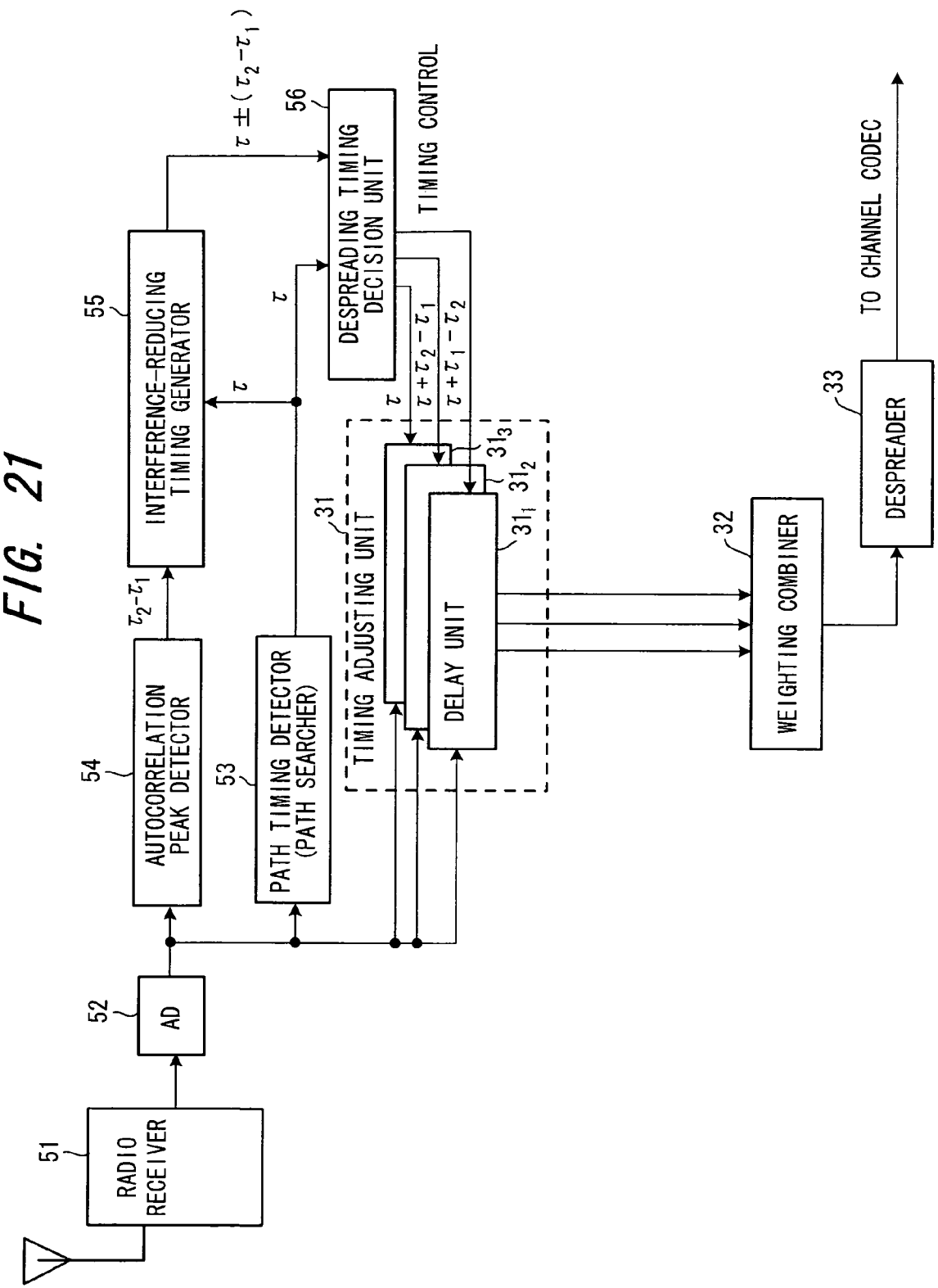
FIG. 21 is a block diagram illustrating the principal components of a CDMA receiver according to a fifth embodiment of the present invention.

In the first to fourth embodiments, the RAKE combining operation is performed after despreading. However, it can be so arranged that combining is performed after the receive signal is delayed by each of the despread timings, and the combined results are subjected to despreading collectively. FIG. 21 is a block diagram illustrating the principal components of a CDMA receiver according to a fifth embodiment of such an arrangement. Components identical with those of the first embodiment shown in FIG. 7 are designated by like reference characters.

Delay units 31, to 313 of a timing adjusting unit 31 delay the spread-spectrum signal by the despreading timings $\tau$, $\tau \pm (\tau_2 - \tau_1)$, respectively, that enter from the despreading timing decision unit 56, a weighting combiner 32 combines the delayed signals upon weighting them, and a despreader 33 multiplies the combined signal by spreading code to thereby despread the signal and inputs the obtained despread signal to the channel codec.

Figure 22:
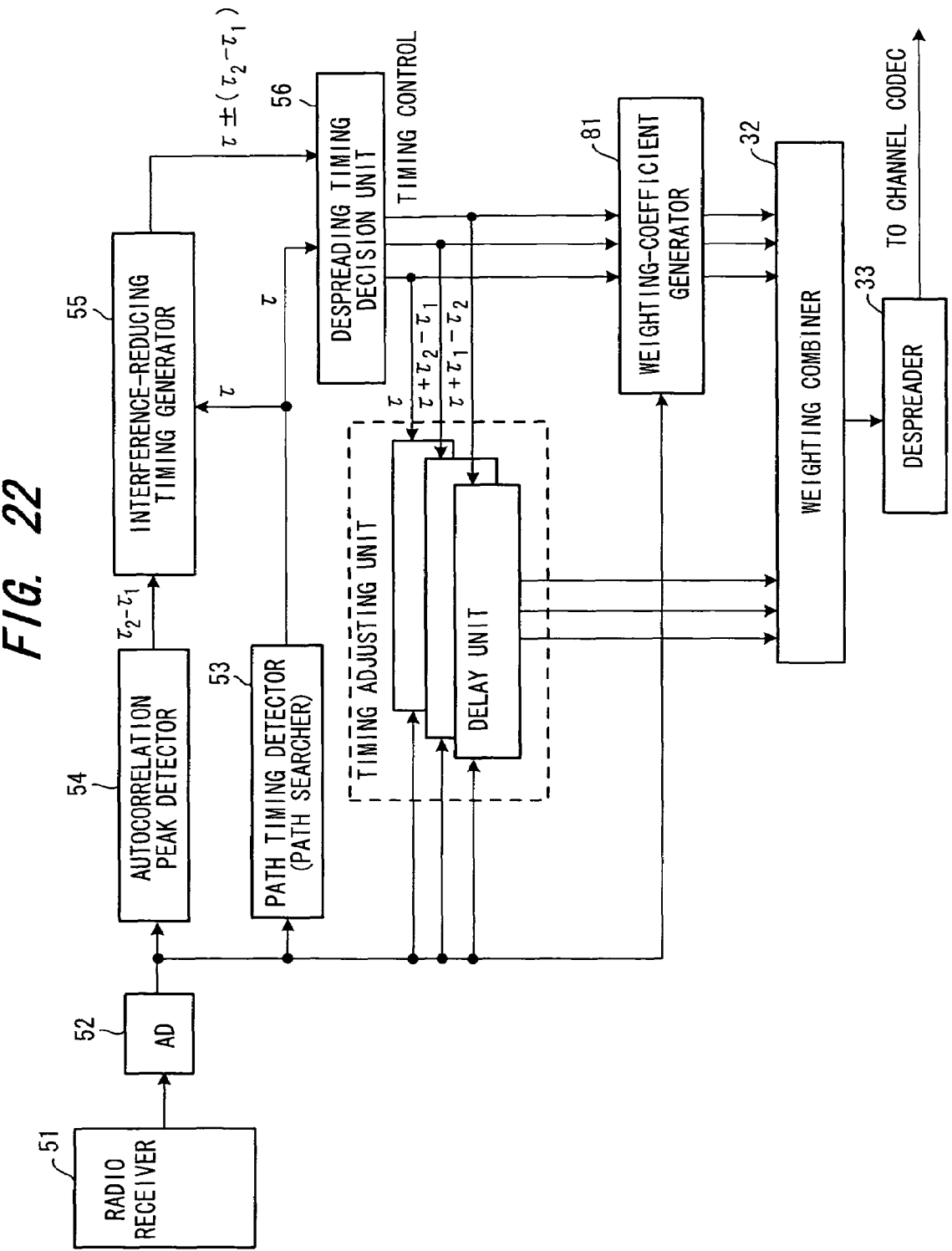
FIG. 22 is a block diagram illustrating the principal components of a CDMA receiver having a weighting-coefficient generator.
Figure 23:
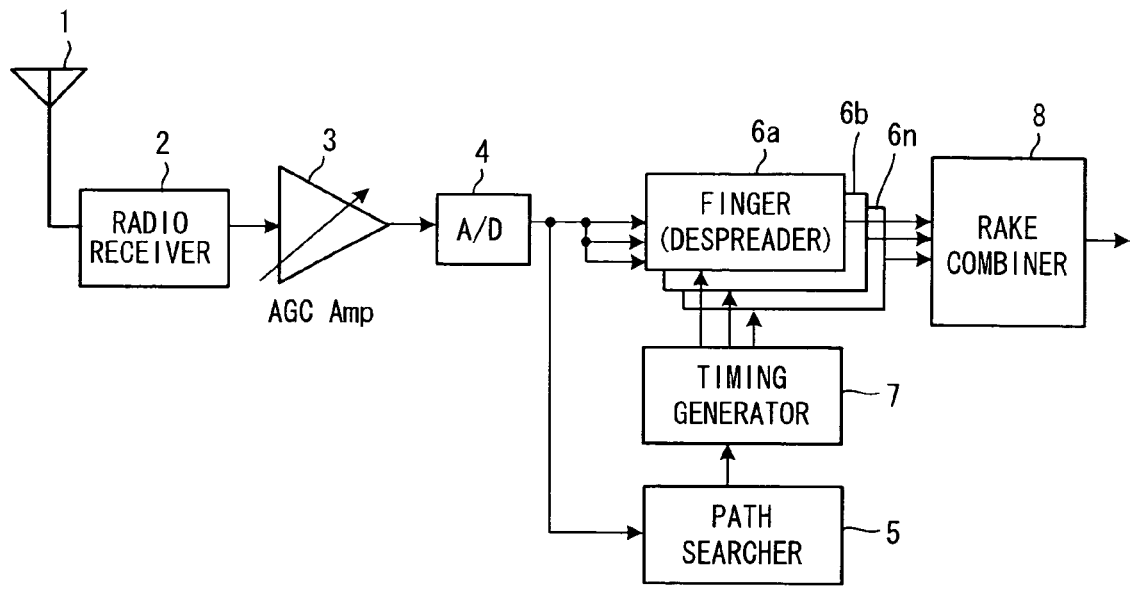
FIG. 23 is a block diagram of a RAKE receiver according to the prior art.
Figure 24:
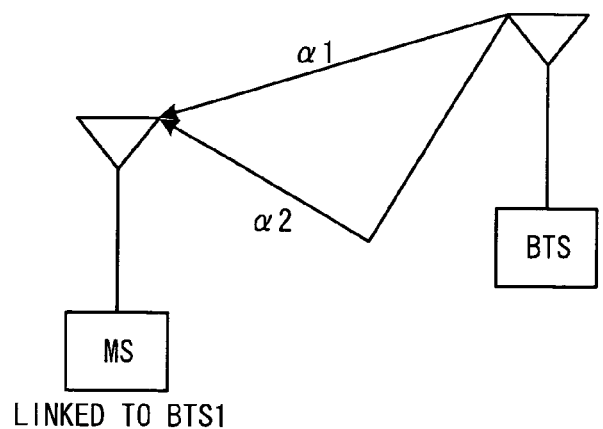
FIG. 24 is a diagram (for two paths) useful in describing MIXR according to the prior art.
Figure 25:
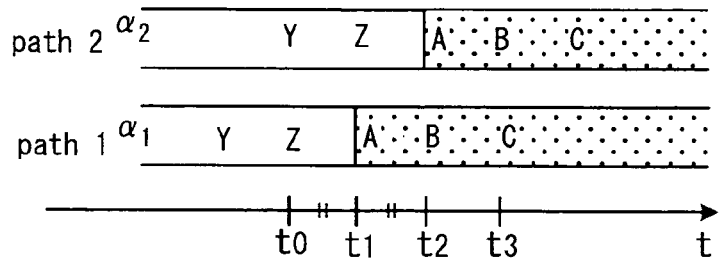
FIG. 25 is a diagram useful in describing MIXR (namely a diagram for describing timing involving signals on two paths) according to the prior art.
Figure 26:
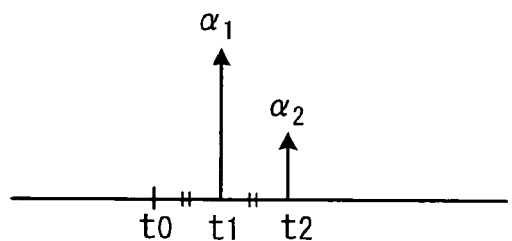
FIG. 26 is a diagram useful in describing MIXR (namely a diagram for describing a delay profile of two paths) according to the prior art.
Figure 27:
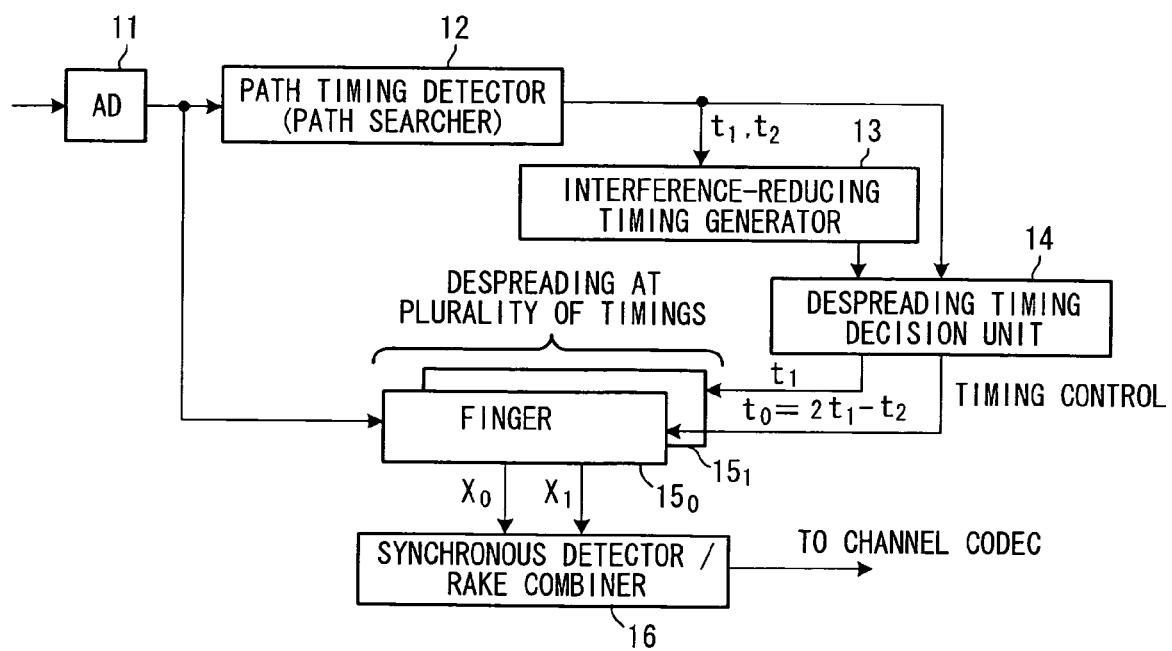
FIG. 27 is a block diagram of a RAKE receiver that employs the MIXR interference reduction method.

FIG. 22 is a block diagram illustrating the principal components of a CDMA receiver having a weighting-coefficient generator. This arrangement is obtained by providing the CDMA receiver of the fifth embodiment (see FIG. 21) with the weighting-coefficient generator 81.

Modification

In a modification of the second embodiment of FIG. 9, the fingers 57$_1$ to 57$_3$ and synchronous detector/RAKE combiner 58 are deleted and instead the timing adjusting unit 31 and weighting combiner 32 are provided, and it can be so arranged that combining is performed after the receive signal is delayed by each of the despread timings and the combined results are subjected to despreading collectively as in the fifth embodiment.

As many apparently widely different embodiments of the present invention can be made without departing from the spirit and scope thereof, it is to be understood that the invention is not limited to the specific embodiments thereof except as defined in the appended claims.

What is claimed is:

1. An interference reduction apparatus for diminishing an interference component contained in a despread signal obtained by despreading a spread-spectrum signal, comprising:

peak detecting unit for calculating autocorrelation of a receive signal and detecting a signal peak;

a multipath timing deciding unit for deciding timing of multipath from a base station with which communication is currently in progress;

an interference-reducing timing decision unit for deciding an interference-reducing timing that is for diminishing an interference component arriving from an adjacent base station, using timing of said signal peak and the timing of said multipath;

a despreading timing decision unit for deciding a plurality of despreading timings, at which despreading will be performed, based upon said interference-reducing timing and the timing of said multipath;

a despreader for despreading the spread-spectrum signal at each of the despreading timings; and a combiner for RAKE-combining a plurality of results of despreading.

2. The apparatus according to claim 1, wherein said interference-reducing timing decision unit adopts a timing at which a peak value is largest as the timing of the signal peak.

3. The apparatus according to claim 1, further comprising a weighting-coefficient calculating unit for calculating weights of each of the results of despreading so as to diminish interference components; wherein said combiner weights and combines the results of despreading.

4. An interference reduction apparatus for diminishing an interference component contained in a despread signal obtained by despreading a spread-spectrum signal, comprising:

a delay profile calculating unit for calculating a delay profile from an adjacent base station;

a multipath timing deciding unit for deciding timing of multipath from a base station with which communication is currently in progress;

an interference-reducing timing decision unit for deciding an interference-reducing timing that is for diminishing an interference component arriving from the adjacent base station, using timing of the delay profile and the timing of said multipath;

a despreading timing decision unit for deciding a plurality of despreading timings, at which despreading will be performed, based upon said interference-reducing timing and the timing of said multipath;

a despreader for despreading the spread-spectrum signal at each of the despreading timings; and a combiner for RAKE-combining a plurality of results of despreading.

5. The apparatus according to claim 4, wherein said interference-reducing timing decision unit obtains timings of first and second largest power in the delay profile and decides the interference-reducing timing using a timing difference between these two timings and the timing of said multipath.

6. The apparatus according to claim 4, further comprising a weighting-coefficient calculating unit for calculating weights of each of the results of despreading so as to diminish interference components; wherein said combiner weights and combines the results of despreading.

7. An interference reduction method in a CDMA receiving apparatus for diminishing an interference component contained in a despread signal obtained by despreading a spread-spectrum signal, said method comprising steps of:

calculating autocorrelation of a receive signal and detecting a signal peak;

deciding timing of multipath from a base station with which communication is currently in progress;

deciding an interference-reducing timing that is for diminishing an interference component arriving from an adjacent base station, using timing of said signal peak and the timing of said multipath;

deciding a plurality of despreading timings, at which despreading will be performed, based upon said interference-reducing timing and the timing of said multipath;

despreading the spread-spectrum signal at each of the despreading timings; and combining a plurality of results of despreading to thereby diminish the interference component.

8. The method according to claim 7, wherein a timing at which a peak value is largest is adopted as the timing of the signal peak.

9. The method according to claim 7, further comprising a step of calculating weights of each of the results of despreading so as to diminish interference components; wherein the results of despreading are weighted and combined at said combining step.

10. An interference reduction method in a CDMA receiving apparatus for diminishing an interference component contained in a despread signal obtained by despreading a spread-spectrum signal, said method comprising steps of:
   calculating a delay profile from an adjacent base station;
   deciding timing of multipath from a base station with which communication is currently in progress;
   deciding an interference-reducing timing that is for diminishing an interference component arriving from the adjacent base station, using timing of the delay profile and the timing of the multipath;
   deciding a plurality of despreading timings, at which despreading will be performed, based upon said interference-reducing timing and the timing of said multipath;
   despreading the spread spectrum signal at each of the despreading timings; and
   combining a plurality of results of despreading to thereby diminish the interference component.

11. The method according to claim 10, further comprising steps of:
   obtaining timings of first and second largest power in the delay profile; and
   deciding the interference-reducing timing using a timing difference between these two timings and the timing of multipath.

12. The method according to claim 10, further comprising a step of calculating weights of each of the results of despreading so as to diminish interference components; wherein the results of despreading are weighted and combined at said combining step.

* * * * *